US010726767B2

(12) United States Patent
Park et al.

(10) Patent No.: US 10,726,767 B2
(45) Date of Patent: Jul. 28, 2020

(54) DISPLAY APPARATUS AND METHOD OF DRIVING THE SAME

(71) Applicant: Samsung Display Co., LTD., Yongin-si (KR)

(72) Inventors: Haengwon Park, Seongnam-si (KR); Hyeonseok Bae, Suwon-si (KR); Myoung Jun Chai, Asan-si (KR); Seunghoon Han, Yongin-si (KR); Dongwon Park, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 7 days.

(21) Appl. No.: 15/944,207

(22) Filed: Apr. 3, 2018

(65) Prior Publication Data
US 2018/0286304 A1 Oct. 4, 2018

(30) Foreign Application Priority Data

Apr. 4, 2017 (KR) .......................... 10-2017-0043917

(51) Int. Cl.
*G09G 3/22* (2006.01)
*H04N 5/202* (2006.01)
(Continued)

(52) U.S. Cl.
CPC .......... *G09G 3/22* (2013.01); *G02F 1/136286* (2013.01); *G09G 3/3614* (2013.01);
(Continued)

(58) Field of Classification Search
CPC .......... G02F 1/136286; G02F 1/13306; G09G 2300/0452; G09G 2310/0213;
(Continued)

(56) References Cited

U.S. PATENT DOCUMENTS

2006/0256069 A1\* 11/2006 Okazaki ............... G09G 3/3655
345/102
2008/0100553 A1\* 5/2008 Shen ..................... G09G 3/2092
345/89

(Continued)

FOREIGN PATENT DOCUMENTS

KR 1019950001375 A 1/1995
KR 1020010062324 A 7/2001
(Continued)

*Primary Examiner* — Richard J Hong
(74) *Attorney, Agent, or Firm* — Cantor Colburn LLP

(57) ABSTRACT

A display apparatus includes a display panel, a gate driver and a data driver. The display panel displays an image and includes first sub-pixels which display a first color, second sub-pixels which display a second color different from the first color, first gate lines to which only the first sub-pixels are connected, second gate lines to which only the second sub-pixels are connected, and data lines. The gate sequentially applies first gate signals only to the first gate lines during a first duration of a first frame, and sequentially applies second gate signals only to the second gate lines during a second duration of the first frame, where the second duration is subsequent to the first duration. The data driver outputs data voltages to the data lines based on input image data in synchronization with a driving sequence of the first and second gate lines.

18 Claims, 24 Drawing Sheets

(51) Int. Cl.
*G02F 1/1362* (2006.01)
*G09G 3/36* (2006.01)

(52) U.S. Cl.
CPC ............ *G09G 3/3655* (2013.01); *H04N 5/202* (2013.01); *G09G 2300/0452* (2013.01); *G09G 2310/0213* (2013.01); *G09G 2310/0235* (2013.01); *G09G 2310/0264* (2013.01); *G09G 2320/0209* (2013.01); *G09G 2320/0219* (2013.01); *G09G 2320/0673* (2013.01)

(58) Field of Classification Search
CPC ... G09G 2310/0235; G09G 2310/0264; G09G 2320/0209; G09G 2320/0219; G09G 2320/0673; G09G 3/22; G09G 3/3614; G09G 3/3655; G09G 3/3688; G09G 3/3651; G09G 3/3607; G09G 3/3648; G09G 3/2003; G09G 3/3233; G09G 3/20; G09G 3/3696; G09G 3/3208; G09G 5/10; G09G 3/2092; H04N 5/202
See application file for complete search history.

(56) References Cited

U.S. PATENT DOCUMENTS

| | | | | |
|---|---|---|---|---|
| 2008/0186296 A1* | 8/2008 | Tokumura | ............ | G09G 3/3614 345/209 |
| 2008/0224975 A1* | 9/2008 | Lee | ............ | G09G 3/3648 345/89 |
| 2009/0096738 A1* | 4/2009 | Chen | ............ | G09G 3/3688 345/98 |
| 2010/0085348 A1* | 4/2010 | Bae | ............ | G09G 3/3648 345/213 |
| 2010/0156947 A1* | 6/2010 | Moon | ............ | G09G 3/3648 345/690 |
| 2012/0032998 A1* | 2/2012 | An | ............ | G09G 3/3696 345/690 |
| 2012/0307174 A1* | 12/2012 | Lee | ............ | G09G 3/2003 349/54 |
| 2013/0083083 A1* | 4/2013 | Woo | ............ | G09G 3/3208 345/690 |
| 2013/0162699 A1* | 6/2013 | Chen | ............ | G09G 3/3651 345/690 |
| 2013/0249969 A1* | 9/2013 | Jeon | ............ | G09G 5/10 345/691 |
| 2014/0022225 A1* | 1/2014 | Lee | ............ | G09G 3/20 345/211 |
| 2014/0049713 A1* | 2/2014 | No | ............ | G02F 1/13306 349/41 |
| 2014/0071106 A1* | 3/2014 | Lin, Jr. | ............ | G09G 3/3688 345/211 |
| 2015/0187290 A1* | 7/2015 | No | ............ | G09G 3/3607 345/694 |
| 2017/0193913 A1* | 7/2017 | Lee | ............ | G09G 3/3233 |

FOREIGN PATENT DOCUMENTS

| | | |
|---|---|---|
| KR | 1020030000146 A | 1/2003 |
| KR | 1020030028037 A | 4/2003 |
| KR | 1020030038897 A | 5/2003 |
| KR | 1020030089272 A | 11/2003 |
| KR | 1020040028798 A | 4/2004 |
| KR | 1020040034364 A | 4/2004 |
| KR | 1020050033297 A | 4/2005 |
| KR | 1020050068595 A | 7/2005 |
| KR | 1020050123158 A | 12/2005 |
| KR | 1020060014253 A | 2/2006 |
| KR | 1020060056710 A | 5/2006 |
| KR | 1020060085543 A | 7/2006 |
| KR | 1020070014581 A | 2/2007 |
| KR | 1020070039093 A | 4/2007 |
| KR | 1020070042803 A | 4/2007 |
| KR | 1020070101712 A | 10/2007 |
| KR | 1020090031199 A | 3/2009 |
| KR | 1020110045259 A | 5/2011 |
| KR | 101192800 B1 | 10/2012 |
| KR | 1020120120987 A | 11/2012 |
| KR | 1020130037019 A | 4/2013 |
| KR | 1020130112193 A | 10/2013 |
| KR | 1020150077579 A | 7/2015 |

* cited by examiner

DISPLAY APPARATUS AND METHOD OF DRIVING THE SAME

This application claims priority to Korean Patent Application No. 10-2017-0043917, filed on Apr. 4, 2017, and all the benefits accruing therefrom under 35 U.S.C. § 119, the content of which in its entirety is herein incorporated by reference.

BACKGROUND

1. Field

Exemplary embodiments of the invention relate generally to a display device, and more particularly to a display apparatus and a method of driving the display apparatus.

2. Description of the Related Art

A display apparatus, such as a liquid crystal display ("LCD") apparatus and an organic light emitting display apparatus, typically includes a display panel and a panel driver. The display panel may include a plurality of gate lines, a plurality of data lines and a plurality of pixels connected to the gate lines and the data lines. The panel driver typically includes a gate driver for providing gate signals to the gate lines and a data driver for providing data voltages to the data lines.

The LCD apparatus may include a first substrate including a pixel electrode, a second substrate including a common electrode and a liquid crystal layer disposed between the first and second substrate. In such an LCD, an electric field is generated by voltages applied to the pixel electrode and the common electrode. By adjusting an intensity of the electric field, a transmittance of a light passing through the liquid crystal layer may be adjusted so that a desired image may be displayed.

The organic light emitting display apparatus displays images using organic light emitting diodes ("OLEDs"). The OLED generally includes an organic layer between two electrodes, i.e., an anode and a cathode. Holes from the anode may be combined with electrons from the cathode in the organic layer between the anode and the cathode to emit light.

SUMMARY

In a display apparatus, a common voltage applied to a common electrode is controlled based on a kickback voltage. The common voltage may affect the quality of the image such as afterimage, crosstalk and flicker.

Exemplary embodiments of the invention provide a display apparatus with improved display quality.

Exemplary embodiments of the invention provide a method of driving the display apparatus.

According to an exemplary embodiment of the invention, a display apparatus includes a display panel, a gate driver and a data driver. In such an embodiment, the display panel displays an image, and the display panel includes first sub-pixels which display a first color, second sub-pixels which display a second color different from the first color, a plurality of first gate lines to which only the first sub-pixels are connected, a plurality of second gate lines to which only the second sub-pixels are connected, and data lines. In such an embodiment, the gate driver sequentially applies first gate signals only to the first gate lines during a first duration of a first frame, and sequentially applies second gate signals only to the second gate lines during a second duration of the first frame, where the second duration is subsequent to the first duration. In such an embodiment, the data driver outputs data voltages to the data lines based on input image data in synchronization with a driving sequence of the first and second gate lines.

In an exemplary embodiment, the display apparatus may further include a gamma reference voltage generator which generates a first gamma reference voltage based on a first gamma curve, and generates a second gamma reference voltage based on a second gamma curve different from the first gamma curve, where the data driver may output first data voltages generated based on the first gamma reference voltage during the first duration, and output second data voltages generated based on the second gamma reference voltage during the second duration.

In an exemplary embodiment, the display apparatus may further include a common voltage generator which output a common voltage to the display panel. In such an embodiment, when a first optimum common voltage to display the first color or a second optimum common voltage to display the second color is higher than the common voltage, the first gamma curve or the second gamma curve may have lower voltages than a reference gamma curve has, and when the first optimum common voltage or the second optimum common voltage is lower than the common voltage, the first gamma curve or the second gamma curve may have higher voltages than the reference gamma curve has.

In an exemplary embodiment, when the first optimum common voltage is higher than the second optimum common voltage, the first gamma curve may have lower voltages than the second gamma curve has, and when the first optimum common voltage is lower than the second optimum common voltage, the first gamma curve may have higher voltages than the second gamma curve has.

In an exemplary embodiment, a unit pixel may be collectively defined by a first sub-pixel of the first sub-pixels and a second sub-pixel of the second sub-pixels, where the first sub-pixel and the second sub-pixel of the unit pixel may be adjacent to each other along the data lines.

In an exemplary embodiment, the display panel may further include a first unit pixel and a second unit pixel, which are adjacent to each other and disposed between a first data line and a second data line of the data lines, where the first and second data lines are adjacent to each other. In such an embodiment, the first unit pixel may be connected to the first data line, and the second unit pixel may be connected to the second data line.

In an exemplary embodiment, the display panel may further include a first unit pixel and a second unit pixel, which are adjacent to each other and disposed between a first data line and a second data line of the data lines, where the first and second data lines are adjacent to each other. In such an embodiment, the first and second unit pixels may be connected to the first data line.

In an exemplary embodiment, the data driver may output first data voltages corresponding to the first sub-pixels during the first duration, and output second data voltages corresponding to the second sub-pixels during the second duration.

In an exemplary embodiment, a polarity of the second data voltages may be opposite to a polarity of the first data voltages.

In an exemplary embodiment, polarities of data voltages applied to data lines adjacent to each other may be opposite to each other in the first frame.

In an exemplary embodiment, the display panel may further include third sub-pixels which display a third color different from the first and second colors, and a plurality of third gate lines to which only the third sub-pixels are connected. In such an embodiment, the gate driver may sequentially apply third gate signals only to the third gate lines during a third duration of the first frame, where the third duration is subsequent to the second duration.

In an exemplary embodiment, the display panel may be divided into a first area and a second area, and may further include a plurality of third gate lines to which only the first sub-pixels are connected, and a plurality of fourth gate lines to which only the second sub-pixels are connected. In such an embodiment, the first and second gate lines may be disposed in the first area, and the third and fourth gate lines may be disposed in the second area. In such an embodiment, the gate driver may sequentially apply third gate signals only to the third gate lines during a third duration of the first frame, and sequentially apply fourth gate signals only to the fourth gate lines during a fourth duration of the first frame, where the third duration is subsequent to the second duration, and the fourth duration is subsequent to the third duration.

In an exemplary embodiment, the display apparatus may further include a gamma reference voltage generator which generates a first gamma reference voltage based on a first gamma curve, and generates a second gamma reference voltage based on a second gamma curve different from the first gamma curve, where the data driver may output first data voltages generated based on the first gamma reference voltage during the first and third durations, and output second data voltages generated based on the second gamma reference voltage during the second and fourth durations.

In an exemplary embodiment, the data driver may output first data voltages corresponding to the first sub-pixels during the first and third durations, and output second data voltages corresponding to the second sub-pixels during the second and fourth durations.

In an exemplary embodiment, the display panel may further include third sub-pixels which display a third color different from the first and second colors, a plurality of fifth gate lines to which only the third sub-pixels are connected, where the fifth gate lines are disposed in the first area, and a plurality of sixth gate lines to which only the third sub-pixels are connected, where the sixth gate lines are disposed in the second area. In such an embodiment, the gate driver may sequentially apply fifth gate signals only to the fifth gate lines during a fifth duration of the first frame, and sequentially apply sixth gate signals only to the sixth gate lines during a sixth duration of the first frame, where the fifth duration is between the second duration and the third duration, and the sixth duration is subsequent to the fourth duration.

According to an exemplary embodiment of the invention, a display apparatus includes a display panel, a gate driver, a gamma reference voltage generator and a data driver. In such an embodiment, the display panel displays an image, and the display panel includes first sub-pixels which display a first color, second sub-pixels which display a second color different from the first color, a first gate line to which only the first sub-pixels are connected, a second gate line to which only the second sub-pixels are connected, and data lines. In such an embodiment, the gate driver applies first and second gate signals to the first and second gate lines respectively. In such an embodiment, the gamma reference voltage generator generates a first gamma reference voltage based on a first gamma curve, and generates a second gamma reference voltage based on a second gamma curve different from the first gamma curve. In such an embodiment, the data driver outputs first data voltages generated based on the first gamma reference voltage in synchronization with the first gate signal and second data voltages generated based on the second gamma reference voltage in synchronization with the second gate signal, to the data lines based on input image data.

According to an exemplary embodiment of the invention, a method of driving a display apparatus including a plurality of first gate lines and a plurality of second gate lines, where only first sub-pixels are connected to the first gate lines, only second sub-pixels are connected to the second gate lines, the first sub-pixels display a first color, and the second sub-pixels display a second color different from the first color, includes sequentially applying first gate signals only to the first gate lines during a first duration of a first frame, sequentially applying second gate signals only to the second gate lines during a second duration of the first frame, where the second duration is subsequent to the first duration, outputting data voltages generated based on input image data in synchronization with a driving sequence of the first and second gate lines, and displaying an image based on the data voltages.

In an exemplary embodiment, the method may further include generating a first gamma reference voltage based on a first gamma curve, generating a second gamma reference voltage based on a second gamma curve different from the first gamma curve, outputting first data voltages generated based on the first gamma reference voltage during the first duration, and outputting second data voltages generated based on the second gamma reference voltage during the second duration.

In an exemplary embodiment, the method may further include outputting a common voltage to a display panel. In such an embodiment, when a first optimum common voltage to display the first color or a second optimum common voltage to display the second color is higher than the common voltage, the first gamma curve or the second gamma curve may have lower voltages than a reference gamma curve has, and when the first optimum common voltage or the second optimum common voltage is lower than the common voltage, the first gamma curve or the second gamma curve may have higher voltages than the reference gamma curve has.

In an exemplary embodiment, when the first optimum common voltage is higher than the second optimum common voltage, the first gamma curve may have lower voltages than the second gamma curve has, and when the first optimum common voltage is lower than the second optimum common voltage, the first gamma curve may have higher voltages than the second gamma curve has.

According to exemplary embodiments, in a pixel structure in which each gate line is connected to sub-pixels of a same color, a driving sequence of gate lines may be changed so that a group of gate lines connected to the same color sub-pixels are collectively driven in a frame. Accordingly, sub-pixels of each color may be driven by different driving methods from each other, based on a difference in driving characteristics according to colors.

In such embodiments, the sub-pixels of each color may be driven by different gamma curves to solve the problem due to a difference in an optimum common voltage of sub-pixels depending on colors.

Thus, the display quality of the display apparatus may be improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF EMBODIMENTS

Figure 1:
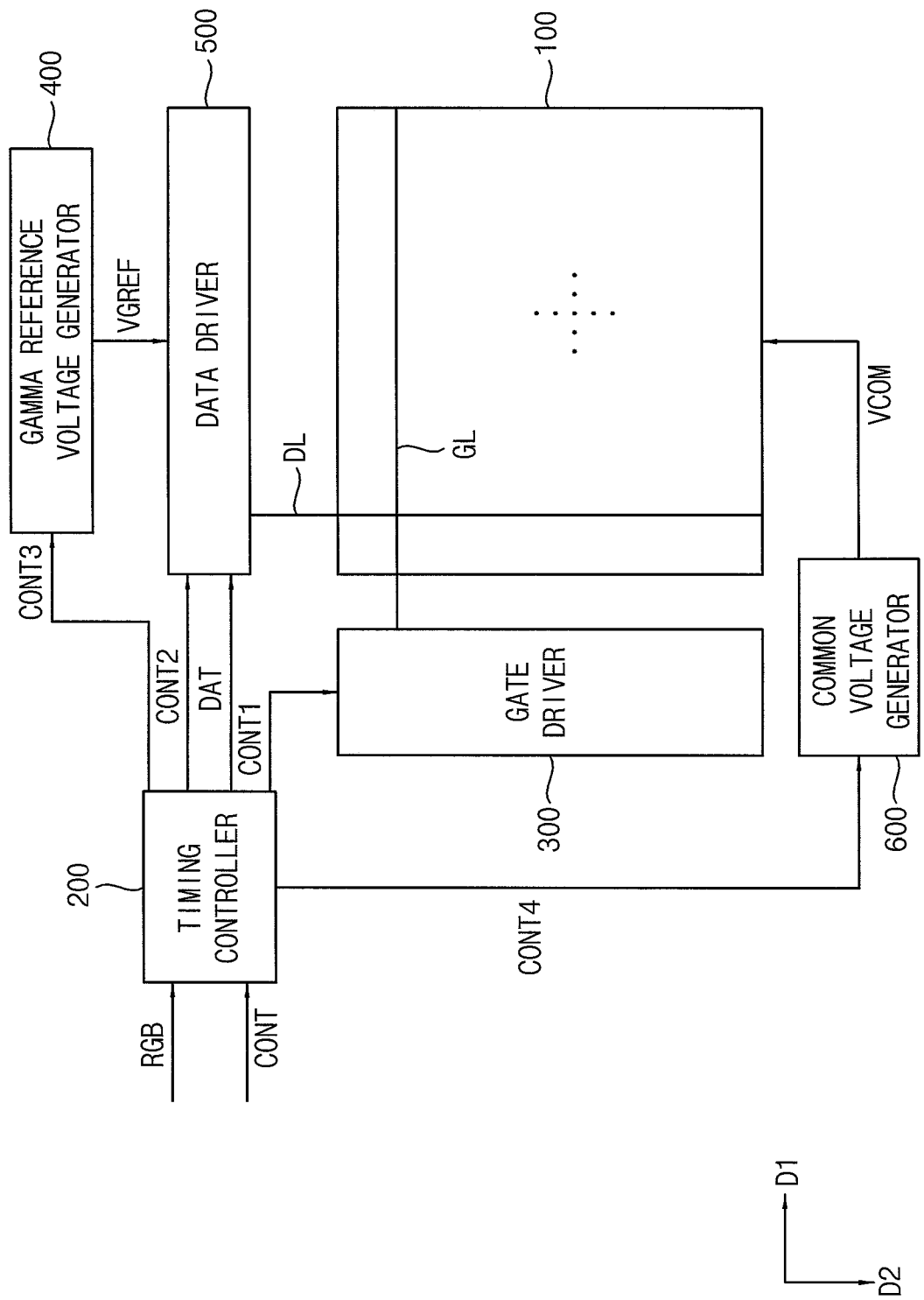
FIG. 1 is a block diagram illustrating a display apparatus according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiment of the invention will be described in detail with reference to the accompanying drawings.

FIG. 1 is a block diagram illustrating a display apparatus according to an exemplary embodiment.

Referring to FIG. 1, an exemplary embodiment of the display apparatus includes a display panel 100 and a panel driver. The panel driver includes a timing controller 200, a gate driver 300, a gamma reference voltage generator 400, a data driver 500 and a common voltage generator 600.

The display panel 100 includes a display region for displaying an image and a peripheral region adjacent to the display region.

The display panel 100 includes a plurality of gate lines GL, a plurality of data lines DL and a plurality of pixels electrically connected to the gate lines GL and the data lines DL. The gate lines GL extend in a first direction D1, and the data lines DL extend in a second direction D2 crossing the first direction D1.

The display panel 100 may include a common electrode and a pixel electrode. The display panel 100 may display the image according to an intensity of an electric field generated between the common electrode and the pixel electrode.

In some exemplary embodiments, the pixels may include a switching element (not shown), a liquid crystal capacitor (not shown) and a storage capacitor (not shown). The liquid crystal capacitor and the storage capacitor may be electrically connected to the switching element. The pixels may be arranged in a matrix configuration.

The display panel 100 will be described in greater detail with reference to FIGS. 2, 8, 9 and 13.

The timing controller 200 receives input image data RGB and an input control signal CONT from an external device (not shown). The input image data RGB may include red image data, green image data and blue image data. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3, a fourth control signal CONT4 and a data signal DAT, based on the input image data RGB and the input control signal CONT.

The timing controller 200 generates the first control signal CONT1 for controlling operations of the gate driver 300 based on the input control signal CONT, and outputs the first control signal CONT1 to the gate driver 300. The first control signal CONT1 may include a vertical start signal and a gate clock signal.

The timing controller 200 generates the second control signal CONT2 for controlling operations of the data driver 500 based on the input control signal CONT, and outputs the second control signal CONT2 to the data driver 500. The second control signal CONT2 may include a horizontal start signal and a load signal.

The timing controller 200 generates the data signal DAT based on the input image data RGB. The timing controller 200 outputs the data signal DAT to the data driver 500. The data signal DAT may be substantially the same image data as the input image data RGB or the data signal DAT may be compensated image data generated by compensating the input image data RGB. In one exemplary embodiment, for example, the timing controller 200 may selectively perform an image quality compensation, a spot compensation, an adaptive color correction ("ACC"), and/or a dynamic capacitance compensation ("DCC") on the input image data RGB to generate the data signal DAT.

The timing controller 200 generates the third control signal CONT3 for controlling operations of the gamma reference voltage generator 400 based on the input control signal CONT, and outputs the third control signal CONT3 to the gamma reference voltage generator 400.

The timing controller 200 generates the fourth control signal CONT4 for controlling operations of the common voltage generator 600 based on the input image data RGB, and outputs the fourth control signal CONT4 to the common voltage generator 600.

The gate driver 300 generates gate signals for driving the gate lines GL in response to the first control signal CONT1 received from the timing controller 200. The gate driver 300 outputs the gate signals to the gate lines GL.

In some exemplary embodiments, the gate driver 300 may be directly mounted on the display panel 100, or may be connected to the display panel 100 as a tape carrier package ("TCP") type. Alternatively, the gate driver 300 may be integrated onto the peripheral region of the display panel 100.

The operations of the gate driver 300 will be described in greater detail with reference to FIGS. 3, 10 and 14.

The gamma reference voltage generator 400 generates a gamma reference voltage VGREF in response to the third control signal CONT3 received from the timing controller 200. The gamma reference voltage generator 400 outputs the gamma reference voltage VGREF to the data driver 500. The level of the gamma reference voltage VGREF corresponds to grayscales of a plurality of pixel data included in the data signal DAT.

In some exemplary embodiments, the gamma reference voltage generator 400 may be disposed in the timing controller 200, or may be disposed in the data driver 500.

The operations of the gamma reference voltage generator 400 will be described in greater detail with reference to FIGS. 5A and 5B.

The data driver 500 receives the second control signal CONT2 and the data signal DAT from the timing controller 200, and receives the gamma reference voltage VGREF from the gamma reference voltage generator 400. The data driver 500 converts the data signal DAT to data voltages having analogue levels based on the gamma reference voltage VGREF. The data driver 500 outputs the data voltages to the pixel electrodes connected to the data lines DL.

In some exemplary embodiments, the data driver 500 may be directly mounted on the display panel 100, or may be connected to the display panel 100 as a TCP type. Alternatively, the data driver 500 may be integrated onto the peripheral region of the display panel 100.

The operations of the data driver 500 will be described in greater detail with reference to FIG. 3.

The common voltage generator 600 generates a common voltage VCOM in response to the fourth control signal CONT4 received from the timing controller 200. The common voltage generator 600 outputs the common voltage VCOM to the common electrode.

The common voltage VCOM will be described in greater detail with reference to FIG. 5A.

The display panel 100 displays the image corresponding to an intensity of an electric field generated between the common electrode, to which the common voltage VCOM is applied, and the pixel electrode, to which the data voltage is applied.

Figure 2:
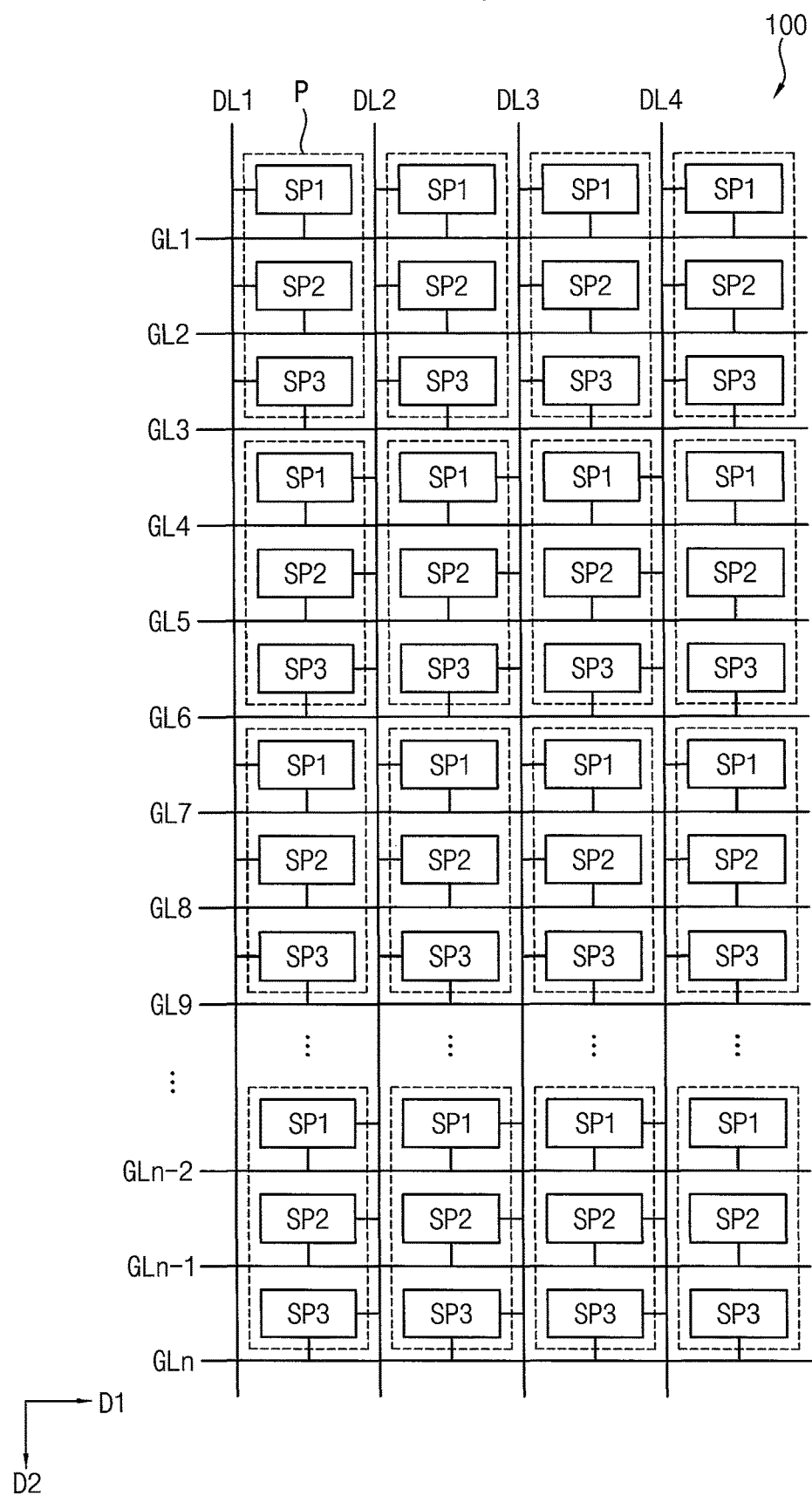
FIG. 2 is a diagram illustrating a portion of a display panel included in a display apparatus according to an exemplary embodiment.

FIG. 2 is a diagram illustrating a portion of a display panel included in a display apparatus according to an exemplary embodiment.

Referring to FIGS. 1 and 2, the display panel 100 includes first through n-th gate lines GL1-GLn and first through fourth data lines DL1-DL4. The first through n-th gate lines GL1-GLn extend in the first direction D1. The first through fourth data lines DL1-DL4 extend in the second direction D2. FIG. 2 illustrates only a portion of the display panel 100, and the display panel 100 may include more data lines.

The display panel 100 includes first sub-pixels SP1 and second sub-pixels SP2. The first sub-pixels SP1 are configured to display a first color. The second sub-pixels SP2 are configured to display a second color different from the first color. The display panel 100 may further include third sub-pixels SP3. The third sub-pixels SP3 may be configured to display a third color different from the first and second colors. In an exemplary embodiment, each of the first through third colors may be one of three primary colors, e.g., red, green and blue. In one exemplary embodiment, for example, the first color may be red, the second color may be green, and the third color may be blue.

In an exemplary embodiment, a plurality of sub-pixels, each of which is configured to display a different color from each other, collectively define a unit pixel P. In one exemplary embodiment, for example, the unit pixel P may include one of the first sub-pixels SP1, one of the second sub-pixels SP2 and one of the third sub-pixels SP3. The sub-pixels included in the unit pixel P may be arranged along the second direction D2.

Each of the first through third sub-pixels SP1, SP2, SP3 is connected to a corresponding one of the gate lines GL and a corresponding one of the data lines DL.

In an exemplary embodiment, each of the gate lines GL is connected to sub-pixels configured to display a same color as each other. In such an embodiment, only one color sub-pixels are connected to one gate line GL. In one exemplary embodiment, for example, only the first sub-pixels SP1 may be connected to the first, fourth, seventh and (n−2)-th gate lines GL1, GL4, GL7, . . . , GLn−2, only the second sub-pixels SP2 may be connected to the second, fifth, eighth and (n−1)-th gate lines GL2, GL5, GL8, . . . , GLn−1, and only the third sub-pixels SP3 may be connected to the third, sixth, ninth and n-th gate lines GL3, GL6, GL9, . . . , GLn.

According to an exemplary embodiment of the invention, as shown in FIG. 2, the unit pixels P in a same pixel column may be connected to two adjacent data lines, between which the same pixel column is disposed, alternately along the second direction D2. In one exemplary embodiment, for example, a first unit pixel disposed between the first data line DL1 and the second data line DL2 may be connected to the first data line DL1, a second unit pixel adjacent to the first unit pixel and disposed between the first data line DL1 and the second data line DL2 may be connected to the second data line DL2, and a third unit pixel adjacent to the second unit pixel and disposed between the first data line DL1 and the second data line DL2 may be connected to the first data line DL1. Such connections may be applied to other unit pixels disposed between other data lines.

Figure 3:
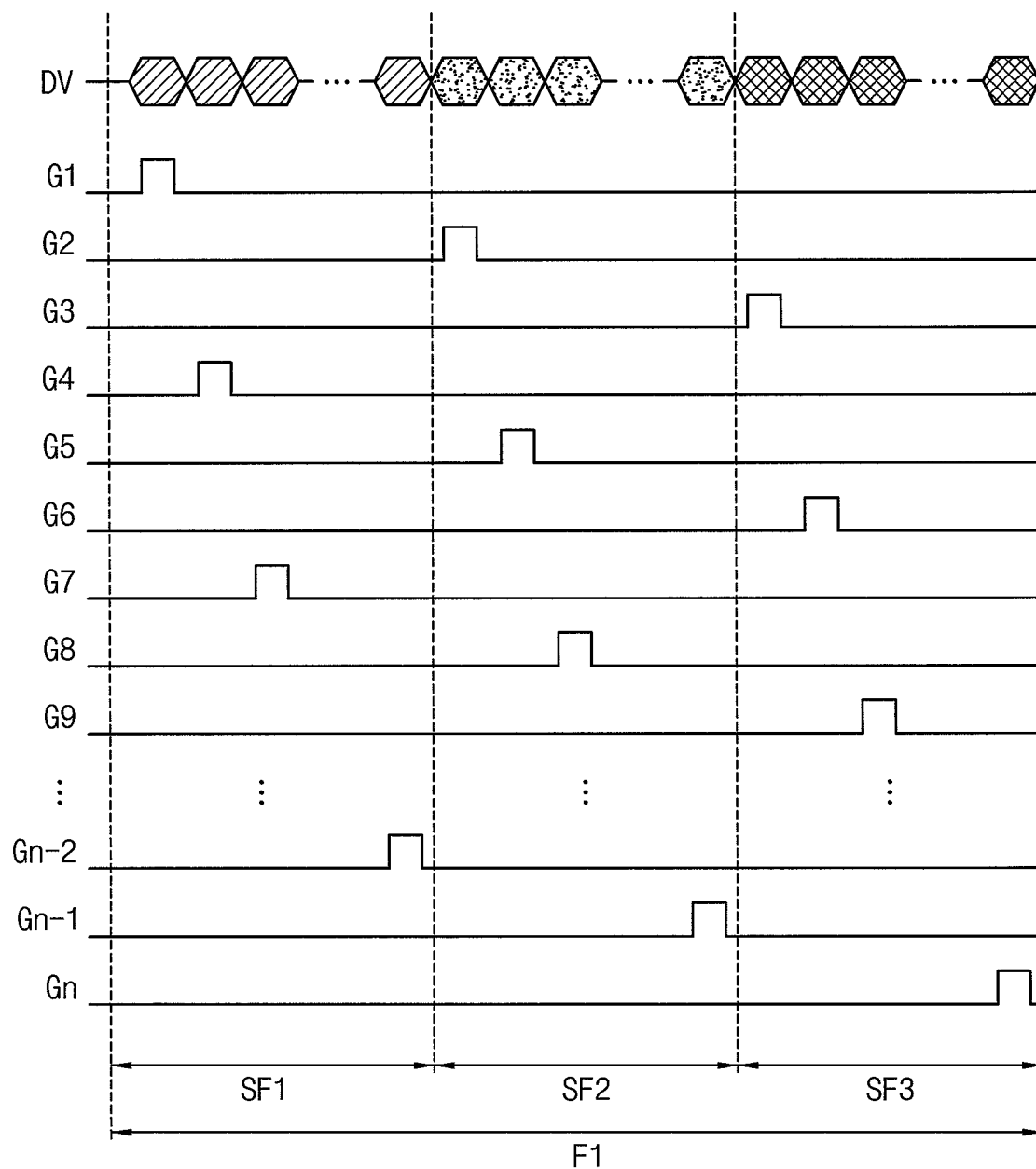
FIG. 3 is a timing diagram illustrating gate signals and data voltages generated in a display apparatus according to an exemplary embodiment.

FIG. 3 is a timing diagram illustrating gate signals and data voltages generated in a display apparatus according to an exemplary embodiment.

Referring to FIGS. 1 through 3, in an exemplary embodiment, a frame F1 may be divided into a plurality of durations. In one exemplary embodiment, for example, the frame F1 may be divided into first through third durations SF1, SF2, SF3. The second duration SF2 may be subsequent to the first duration SF1, and the third duration SF3 may be subsequent to the second duration SF2.

In such an embodiment, the gate driver 300 may sequentially apply the gate signals only to gate lines, to which the first sub-pixels SP1 are connected, during the first duration SF1. In one exemplary embodiment, for example, the gate driver 300 may sequentially apply the gate signals to the first, fourth, seventh to (n−2)-th gate lines GL1, GL4, GL7, GLn−2 during the first duration SF1. In one exemplary embodiment, for example, the gate driver 300 may apply a first gate signal G1 to the first gate line GL1 during a first horizontal period of the first duration SF1, apply a fourth gate signal G4 to the fourth gate line GL4 during a second horizontal period of the first duration SF1, apply a seventh gate signal G7 to the seventh gate line GL7 during a third horizontal period of the first duration SF1, and apply an (n−2)-th gate signal Gn−2 to the (n−2)-th gate line GLn−2 during a final horizontal period of the first duration SF1. The second horizontal period is subsequent to the first horizontal period, and the third horizontal period is subsequent to the second horizontal period.

The data driver 500 may output data voltages DV corresponding to the first sub-pixels SP1 during the first duration SF1. In such an embodiment, the data driver 500 may output data voltages DV corresponding to the first color during the first duration SF1. In one exemplary embodiment, for example, the data driver 500 may output data voltages DV corresponding to first sub-pixels SP1 connected to the first gate line GL1 during the first horizontal period of the first duration SF1, output data voltages DV corresponding to first sub-pixels SP1 connected to the fourth gate line GL4 during the second horizontal period of the first duration SF1, output data voltages DV corresponding to first sub-pixels SP1 connected to the seventh gate line GL7 during the third horizontal period of the first duration SF1, and output data voltages DV corresponding to first sub-pixels SP1 connected to the (n−2)-th gate line GLn−2 during the final horizontal period of the first duration SF1.

In such an embodiment, the gate driver 300 may sequentially apply the gate signals only to gate lines to which the second sub-pixels SP2 are connected during the second duration SF2. In one exemplary embodiment, for example, the gate driver 300 may sequentially apply the gate signals to the second, fifth, eighth and (n−1)-th gate lines GL2, GL5, GL8, . . . , GLn−1 during the second duration SF2. In one exemplary embodiment, for example, the gate driver 300 may apply a second gate signal G2 to the second gate line GL2 during a first horizontal period of the second duration SF2, apply a fifth gate signal G5 to the fifth gate line GL5 during a second horizontal period of the second duration SF2, apply a eighth gate signal G8 to the eighth gate line GL8 during a third horizontal period of the second duration SF2, and apply an (n−1)-th gate signal Gn−1 to the (n−1)-th gate line GLn−1 during a final horizontal period of the second duration SF2. The second horizontal period is subsequent to the first horizontal period, and the third horizontal period is subsequent to the second horizontal period.

The data driver 500 may output data voltages DV corresponding to the second sub-pixels SP2 during the second duration SF2. In other words, the data driver 500 may output data voltages DV corresponding to the second color during the second duration SF2. In one exemplary embodiment, for example, the data driver 500 may output data voltages DV corresponding to second sub-pixels SP2 connected to the second gate line GL2 during the first horizontal period of the second duration SF2, output data voltages DV corresponding to second sub-pixels SP2 connected to the fifth gate line GL5 during the second horizontal period of the second duration SF2, output data voltages DV corresponding to second sub-pixels SP2 connected to the eighth gate line GL8 during the third horizontal period of the second duration SF2, and output data voltages DV corresponding to second sub-pixels SP2 connected to the (n−1)-th gate line GLn−1 during the final horizontal period of the second duration SF2.

The gate driver 300 may sequentially apply the gate signals only to gate lines to which the third sub-pixels SP3 are connected during the third duration SF3. In one exemplary embodiment, for example, the gate driver 300 may sequentially apply the gate signals to the third, sixth, ninth and n-th gate lines GL3, GL6, GL9, . . . , GLn during the third duration SF3. In one exemplary embodiment, for example, the gate driver 300 may apply a third gate signal G3 to the third gate line GL3 during a first horizontal period of the third duration SF3, apply a sixth gate signal G6 to the sixth gate line GL6 during a second horizontal period of the third duration SF3, apply a ninth gate signal G9 to the ninth gate line GL9 during a third horizontal period of the third duration SF3, and apply an n-th gate signal Gn to the n-th gate line GLn during a final horizontal period of the third duration SF3. The second horizontal period is subsequent to the first horizontal period, and the third horizontal period is subsequent to the second horizontal period.

The data driver 500 may output data voltages DV corresponding to the third sub-pixels SP3 during the third duration SF3. In other words, the data driver 500 may output data voltages DV corresponding to the third color during the third duration SF3. In one exemplary embodiment, for example, the data driver 500 may output data voltages DV corresponding to third sub-pixels SP3 connected to the third gate line GL3 during the first horizontal period of the third duration SF3, output data voltages DV corresponding to third sub-pixels SP3 connected to the sixth gate line GL6 during the second horizontal period of the third duration SF3, output data voltages DV corresponding to third sub-pixels SP3 connected to the ninth gate line GL9 during the third horizontal period of the third duration SF3, and output data voltages DV corresponding to third sub-pixels SP3 connected to the n-th gate line GLn during the final horizontal period of the third duration SF3.

In such an embodiment, the operations described above may be repeatedly performed every frame.

Figure 4A:
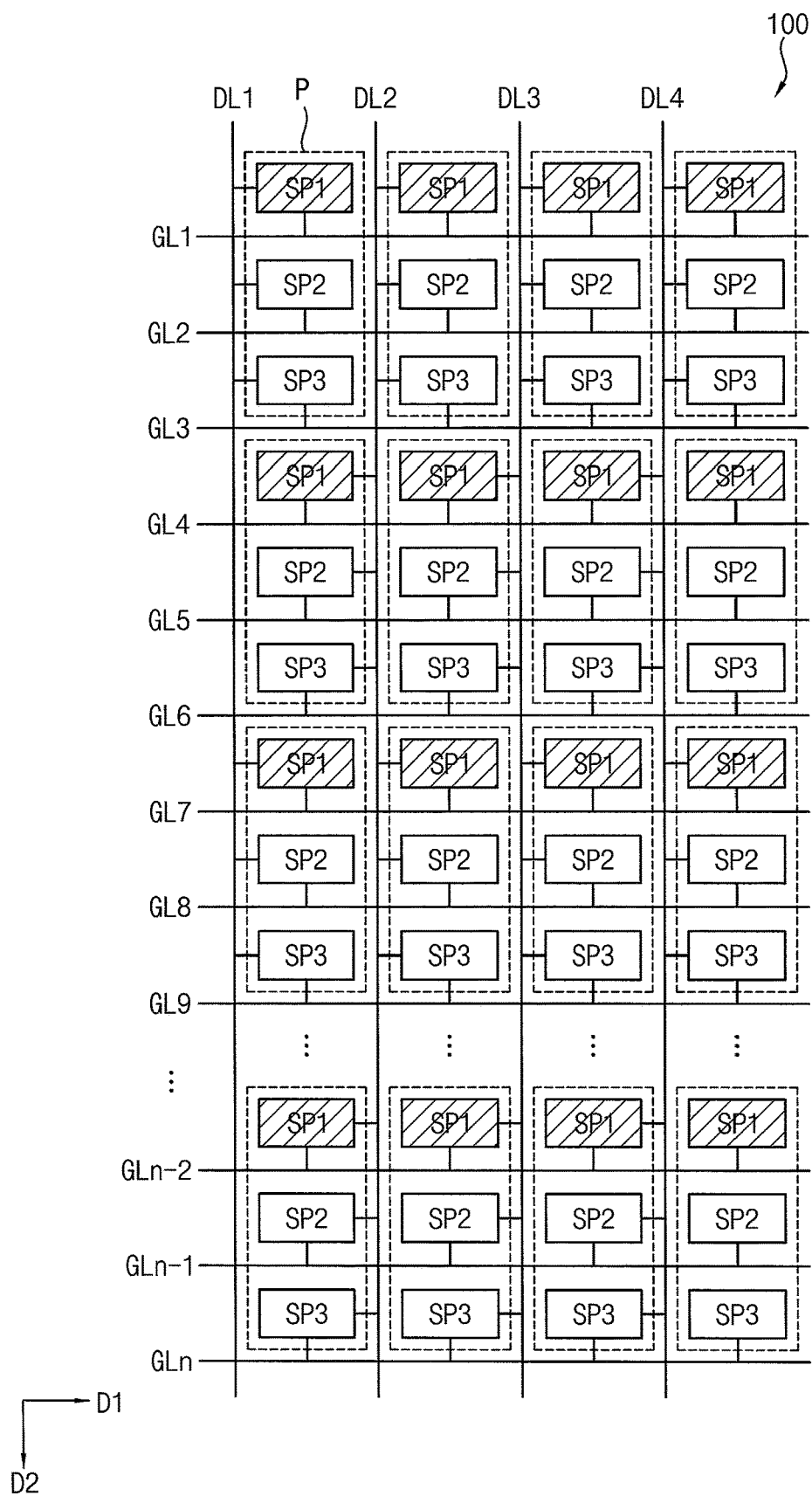
FIG. 4A is a diagram illustrating a portion of a display panel included in a display apparatus during a first duration SF1 of FIG. 3 according to an exemplary embodiment.
Figure 4B:
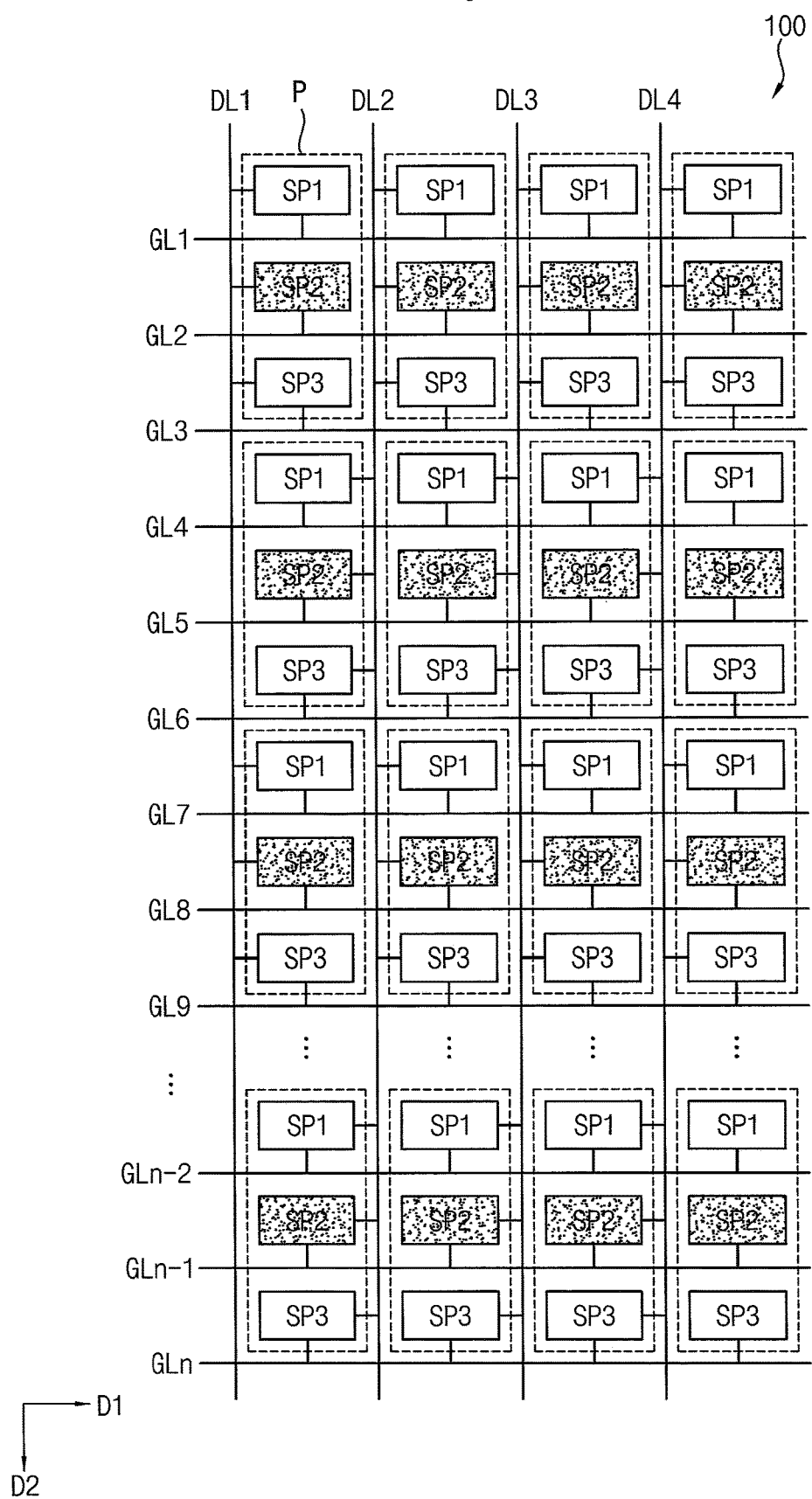
FIG. 4B is a diagram illustrating a portion of a display panel included in a display apparatus during a second duration SF2 of FIG. 3 according to an exemplary embodiment.
Figure 4C:
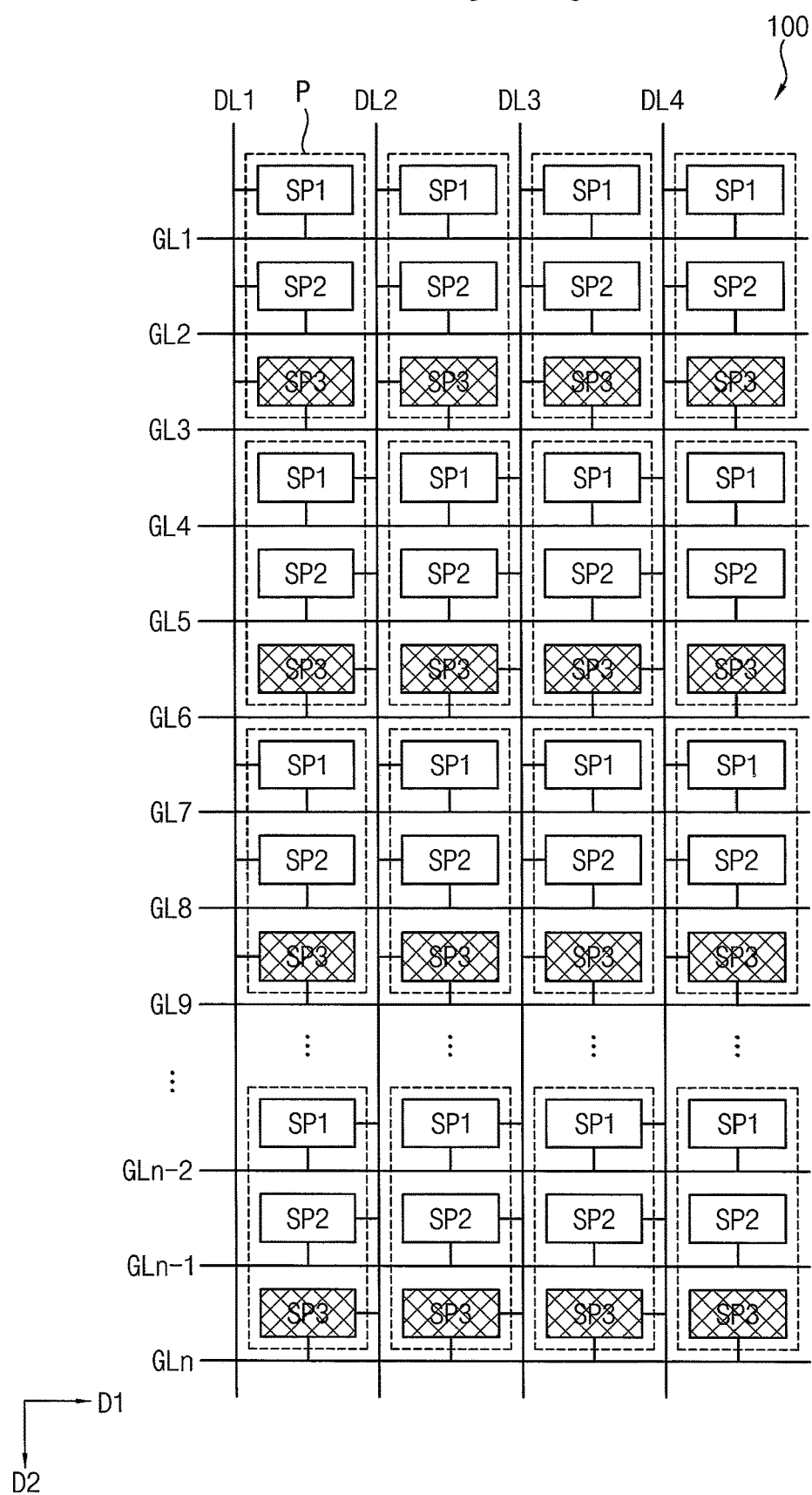
FIG. 4C is a diagram illustrating a portion of a display panel included in a display apparatus during a third duration SF3 of FIG. 3 according to an exemplary embodiment.

FIG. 4A is a diagram illustrating a portion of a display panel included in a display apparatus during a first duration SF1 of FIG. 3 according to an exemplary embodiment. FIG. 4B is a diagram illustrating a portion of a display panel included in a display apparatus during a second duration SF2 of FIG. 3 according to an exemplary embodiment. FIG. 4C is a diagram illustrating a portion of a display panel included in a display apparatus during a third duration SF3 of FIG. 3 according to an exemplary embodiment.

Referring to FIGS. 1 through 3 and 4A, only the first sub-pixels SP1 configured to display the first color are driven during the first duration SF1.

Referring to FIGS. 1 through 3 and 4B, only the second sub-pixels SP2 configured to display the second color are driven during the second duration SF2.

Referring to FIGS. 1 through 3 and 4C, only the third sub-pixels SP3 configured to display the third color are driven during the third duration SF3.

According to an exemplary embodiment, in one frame F1, the first sub-pixels SP1 configured to display the first color is driven during the first duration SF1, the second sub-pixels SP2 configured to display the second color is driven during the second duration SF2, and the third sub-pixels SP3 configured to display the third color is driven during the third duration SF3. Accordingly, in such an embodiment, a driving method for each duration may be selectively controlled based on a difference in driving characteristics according to the colors.

Figure 5A:
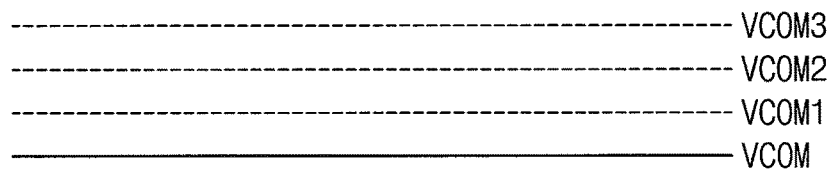
FIG. 5A is a diagram illustrating a common voltage generated in a display apparatus and optimum common voltages corresponding to colors according to an exemplary embodiment.

FIG. 5A is a diagram illustrating a common voltage generated in a display apparatus and optimum common voltages corresponding to colors according to an exemplary embodiment.

Referring to FIGS. 1 and 5A, the common voltage generator 600 outputs the common voltage VCOM to the common electrode of the display panel 100. The common voltage VCOM may affect display quality such as afterimage, crosstalk and flicker. An optimum common voltage to optimize the display quality may depend on colors. In one exemplary embodiment, for example, a first optimum common voltage VCOM1 to optimize the display quality when displaying a first color may be higher than the common voltage VCOM. A second optimum common voltage VCOM2 to optimize the display quality when displaying a second color may be higher than the common voltage VCOM and the first optimum common voltage VCOM1. A third optimum common voltage VCOM3 to optimize the display quality when displaying a third color may be higher than the common voltage VCOM and the first and second optimum common voltages VCOM1, VCOM2. The first through third colors are different from each other. The first through third optimum common voltages VCOM1, VCOM2, VCOM3 in FIG. 5A are merely exemplary, and the optimum common voltage may be variously modified as desired.

In an exemplary embodiment, the display quality may be improved by allowing the first through third optimum common voltages VCOM1, VCOM2, VCOM3 to be substantially equal to or similar to the common voltage VCOM.

Figure 5B:
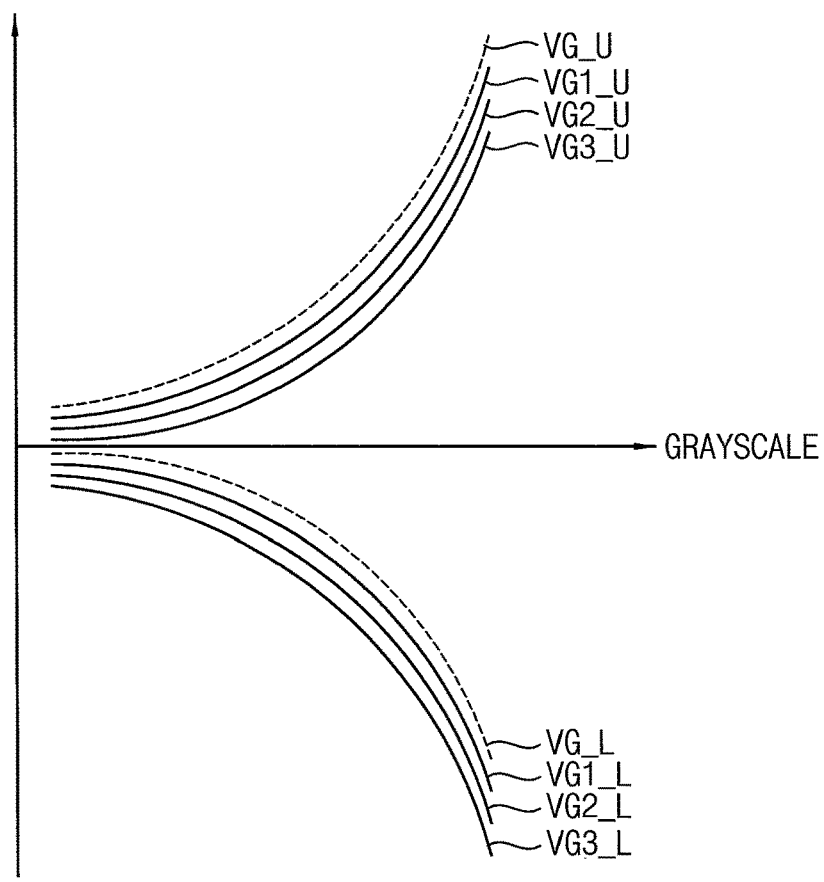
FIG. 5B is a diagram illustrating gamma curves generated in a display apparatus according to an exemplary embodiment.

FIG. 5B is a diagram illustrating gamma curves generated in a display apparatus according to an exemplary embodiment.

Referring to FIGS. 1 through 3, 5A and 5B, a gamma curve is a curve indicating data voltages to display input grayscales.

The gamma reference voltage generator 400 may generate the gamma reference voltage VGREF based on a reference gamma curve VG_U, VG_L. The first optimum common voltage VCOM1 may be an optimum common voltage when displaying the first color based on the reference gamma curve VG_U, VG_L. The second optimum common voltage VCOM2 may be an optimum common voltage when displaying the second color based on the reference gamma curve VG_U, VG_L. The third optimum common voltage VCOM3 may be an optimum common voltage when displaying the third color based on the reference gamma curve VG_U, VG_L.

Alternatively, the gamma reference voltage generator 400 may generate the gamma reference voltage VGREF based on a first gamma curve VG1_U, VG1_L. The first gamma curve VG1_U, VG1_L may have lower voltages than the reference gamma curve VG_U, VG_L has. An optimum common voltage when displaying the first color based on the first gamma curve VG1_U, VG1_L may be substantially equal to or similar to the common voltage VCOM.

Alternatively, the gamma reference voltage generator 400 may generate the gamma reference voltage VGREF based on a second gamma curve VG2_U, VG2_L. The second gamma curve VG2_U, VG2_L may have lower voltages than the reference gamma curve VG_U, VG_L and the first gamma curve VG1_U, VG1_L have. An optimum common voltage when displaying the second color based on the second gamma curve VG2_U, VG2_L may be substantially equal to or similar to the common voltage VCOM.

Alternatively, the gamma reference voltage generator 400 may generate the gamma reference voltage VGREF based on a third gamma curve VG3_U, VG3_L. The third gamma curve VG3_U, VG3_L may have lower voltages than the reference gamma curve VG_U, VG_L and the first and second gamma curves VG1_U, VG1_L, VG2_U, VG2_L have. An optimum common voltage when displaying the third color based on the third gamma curve VG3_U, VG3_L may be substantially equal to or similar to the common voltage VCOM.

The first through third gamma curves VG1_U, VG1_L, VG2_U, VG2_L, VG3_U, VG3_L in FIG. 5B respectively correspond to the first through third optimum common voltages VCOM1, VCOM2, VCOM3 in FIG. 5A. The first through third gamma curves VG1_U, VG1_L, VG2_U, VG2_L, VG3_U, VG3_L may be variously set depending on the first through third optimum common voltages VCOM1, VCOM2, VCOM3.

In an exemplary embodiment, the gamma reference voltage generator 400 may generate a first gamma reference voltage based on the first gamma curve VG1_U, VG1_L corresponding to the first duration SF1. The data driver 500 may generate first data voltages corresponding to the first sub-pixels SP1 based on the first gamma reference voltage during the first duration SF1 to output the first data voltages to the data lines DL.

In such an embodiment, the gamma reference voltage generator 400 may generate a second gamma reference voltage based on the second gamma curve VG2_U, VG2_L corresponding to the second duration SF2. The data driver 500 may generate second data voltages corresponding to the second sub-pixels SP2 based on the second gamma reference voltage during the second duration SF2 to output the second data voltages to the data lines DL.

In such an embodiment, the gamma reference voltage generator 400 may generate a third gamma reference voltage based on the third gamma curve VG3_U, VG3_L corresponding to the third duration SF3. The data driver 500 may generate third data voltages corresponding to the third sub-pixels SP3 based on the third gamma reference voltage during the third duration SF3 to output the third data voltages to the data lines DL.

According to an exemplary embodiment, in one frame F1, data voltages, to which the first gamma curve VG1_U, VG1_L is applied, are outputted to the first sub-pixels SP1 during the first duration SF1, data voltages, to which the second gamma curve VG2_U, VG2_L is applied, are outputted to the second sub-pixels SP2 during the second duration SF2, and data voltages, to which the third gamma curve VG3_U, VG3_L is applied, are outputted to the third sub-pixels SP3 during the third duration SF3. Accordingly, in such an embodiment, the problem due to a difference in an optimum common voltage of sub-pixels depending on the colors may be effectively prevented.

Figure 6:
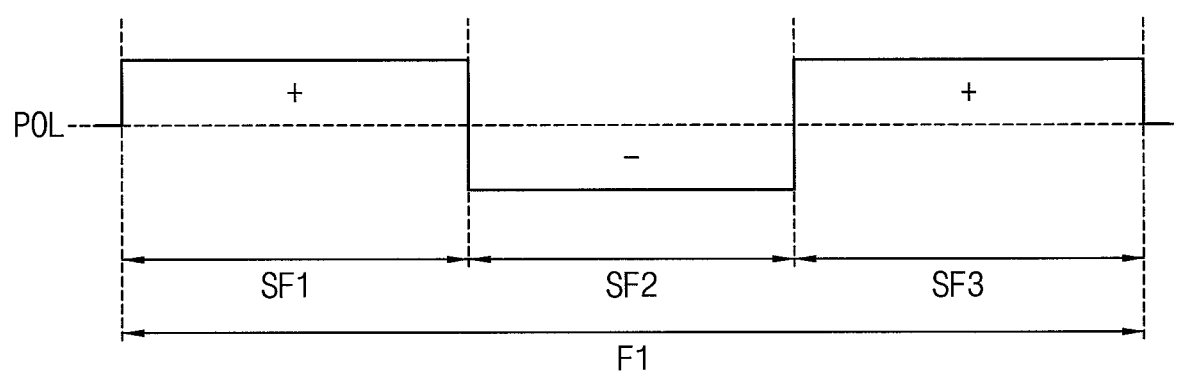
FIG. 6 is a timing diagram illustrating a polarity of data voltages in each duration in a display apparatus according to an exemplary embodiment.
Figure 7:
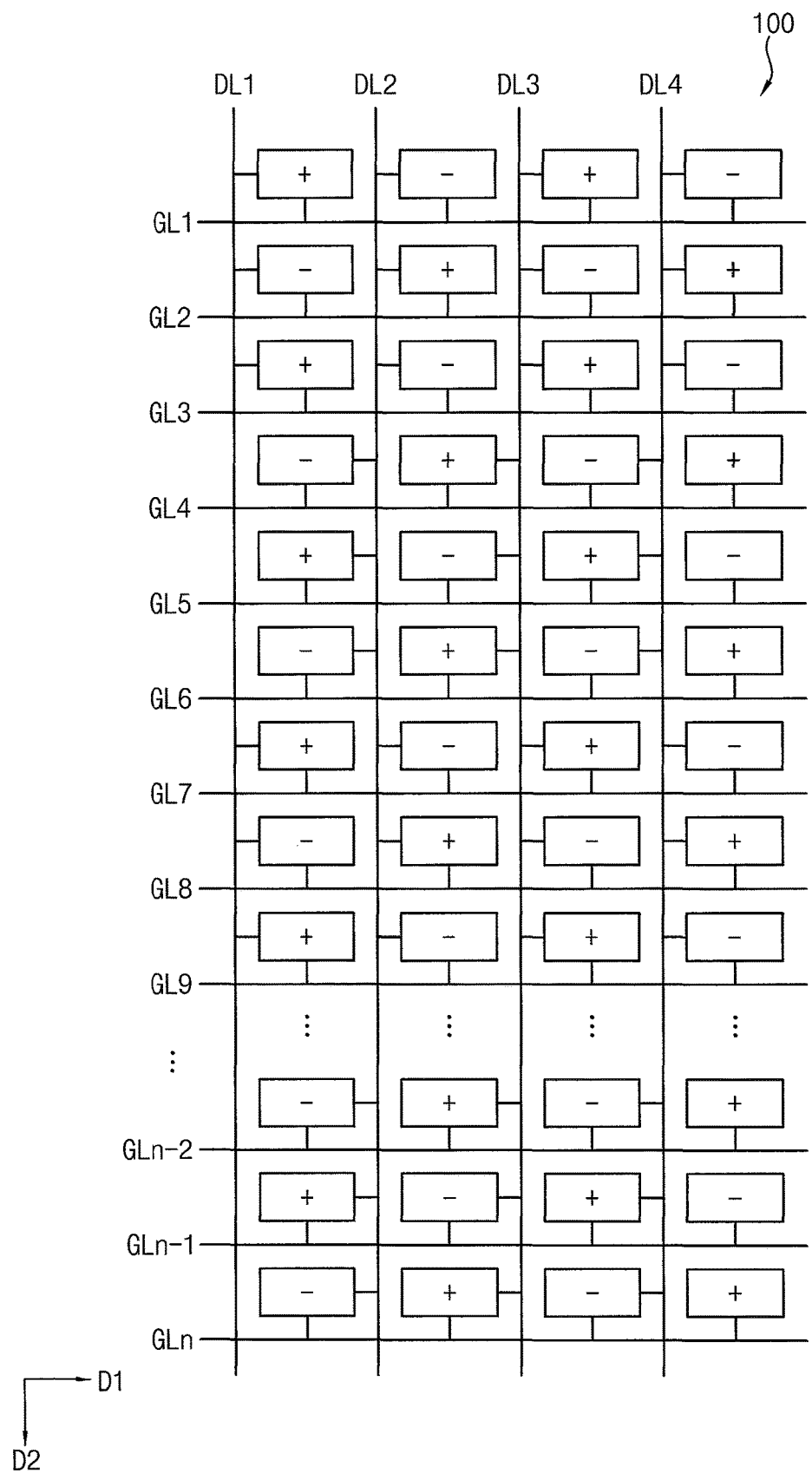
FIG. 7 is a diagram illustrating an arrangement of polarities of pixels in a portion of a display panel included in a display apparatus according to an exemplary embodiment.

FIG. 6 is a timing diagram illustrating a polarity of data voltages in each duration in a display apparatus according to an exemplary embodiment. FIG. 7 is a diagram illustrating an arrangement of polarities of pixels in a portion of a display panel included in a display apparatus according to an exemplary embodiment.

Referring to FIGS. 1 through 3, 6 and 7, a polarity POL of the data voltages may be inverted every duration in a frame F1. In one exemplary embodiment, for example, a polarity of data voltages outputted during the first duration SF1 may be positive (+), a polarity of data voltages outputted during the second duration SF2 may be negative (−), and a polarity of data voltages outputted during the third duration SF3 may be positive (+). Alternatively, the polarity of the data voltages outputted during the first duration SF1 may be negative (−), the polarity of the data voltages outputted during the second duration SF2 may be positive (+), and the polarity of the data voltages outputted during the third duration SF3 may be negative (−).

Polarities of data voltages outputted to two data lines adjacent to each other may be different from each other. In one exemplary embodiment, for example, when a polarity of a data voltage outputted to the first data line DL1 is positive (+), a polarity of a data voltage outputted to the second data line DL2 may be negative (−). When the polarity of the data voltage outputted to the first data line DL1 is negative (−), the polarity of the data voltage outputted to the second data line DL2 may be positive (+).

In such an embodiment, the arrangement of polarities of the dot inversion method as shown in FIG. 7 may be realized. Generally, the dot inversion method is desired in terms of display quality such as flicker, but consumes high power as a polarity is inverted for each horizontal period. According to an exemplary embodiment, the dot inversion method may be realized without consuming high power by not inverting the polarity for each horizontal period, but by inverting the polarity only between the durations.

Figure 8:
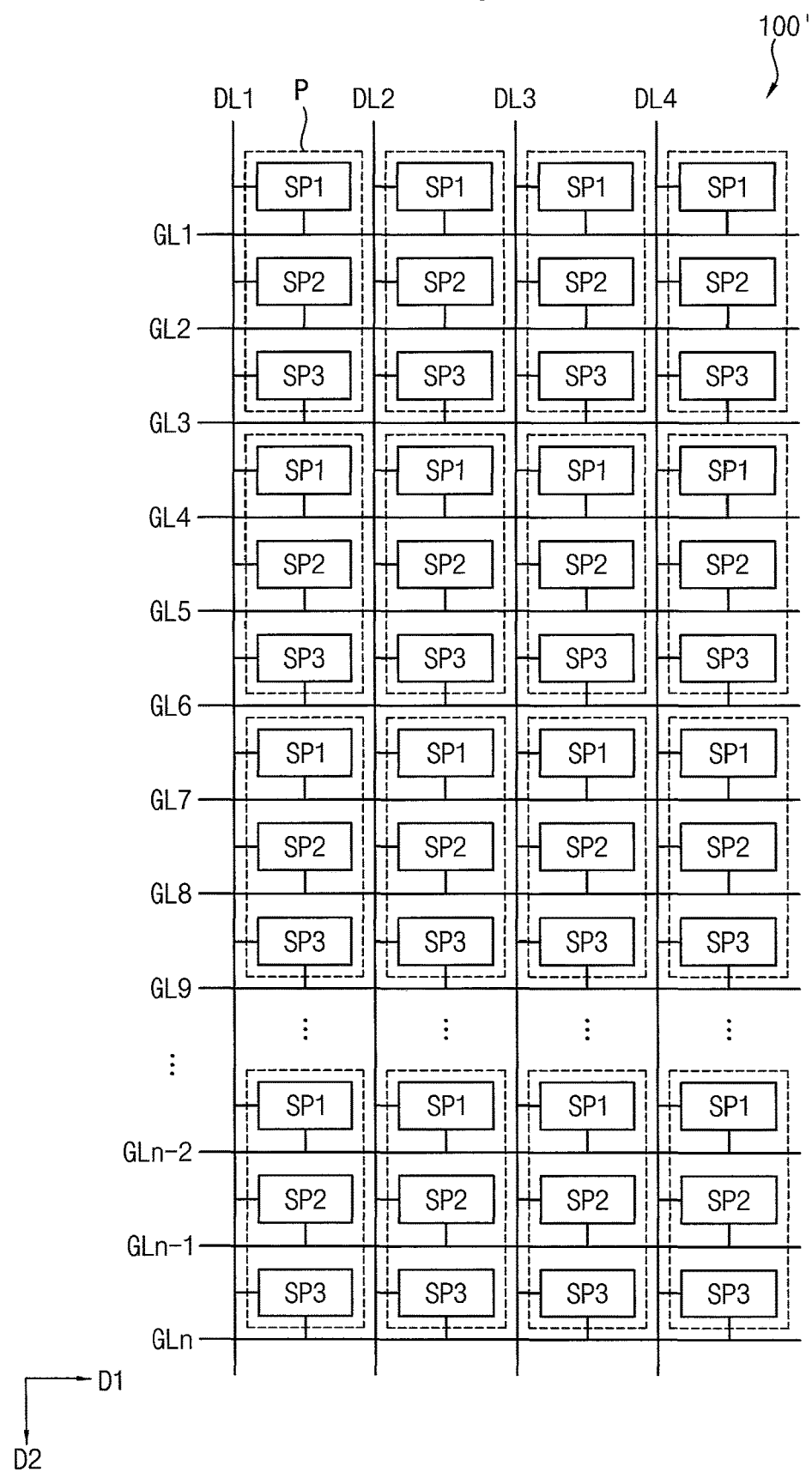
FIG. 8 is a diagram illustrating a portion of a display panel included in a display apparatus according to an alternative exemplary embodiment.

FIG. 8 is a diagram illustrating a portion of a display panel included in a display apparatus according to an alternative exemplary embodiment.

The display panel 100' in FIG. 8 is substantially the same as the display panel 100 in FIG. 2 except for a connection between unit pixels P and data lines DL. The same or like elements shown in FIG. 8 have been labeled with the same reference characters as used above to describe the exemplary embodiments of the display panel described above with reference to FIG. 2, and any repetitive detailed description thereof will hereinafter be omitted or simplified.

According to an exemplary embodiment of the invention, as shown in FIG. 8, the unit pixels P arranged in a same pixel column along the second direction D2 may be connected to a same data line or a single data line. In one exemplary embodiment, for example, all unit pixels disposed between the first data line DL1 and the second data line DL2 may be connected to the first data line DL1, all unit pixels disposed between the second data line DL2 and the third data line DL3 may be connected to the second data line DL2, all unit pixels disposed between the third data line DL3 and the fourth data line DL4 may be connected to the third data line DL3, and all unit pixels disposed between the fourth data line DL4 and the fifth data line DL5 may be connected to the fourth data line DL4. Such connections may be applied to other unit pixels disposed between other data lines.

Figure 9:
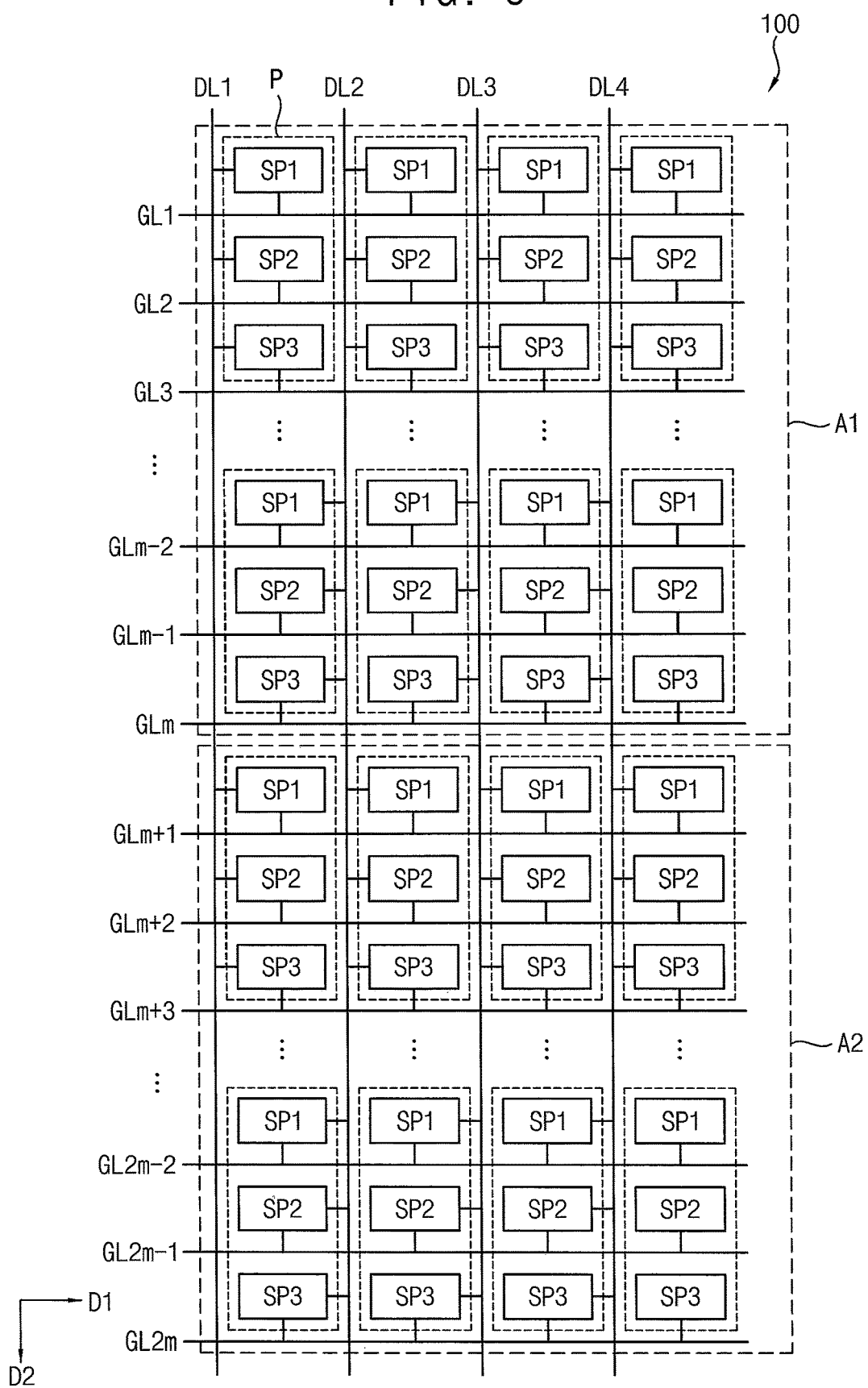
FIG. 9 is a diagram illustrating a portion of a display panel included in a display apparatus according to an exemplary embodiment.

FIG. 9 is a diagram illustrating a portion of a display panel included in a display apparatus according to an exemplary embodiment. The same or like elements shown in FIG. 9 have been labeled with the same reference characters as used above to describe the exemplary embodiments of the display panel described above with reference to FIG. 2, and any repetitive detailed description thereof will hereinafter be omitted or simplified.

Referring to FIGS. 1 and 9, an exemplary embodiment of the display panel 100 may be divided into a plurality of areas. In one exemplary embodiment, for example, the display panel 100 may be divided into first and second areas A1, A2. Alternatively, the display panel 100 may be divided into more than two areas.

Sub-pixels connected to first through m-th gate lines GL1-GLm may be disposed in the first area A1. Sub-pixels connected to (m+1)-th through 2m-th gate lines GLm+1-GL2m may be disposed in the second area A2.

Figure 10:
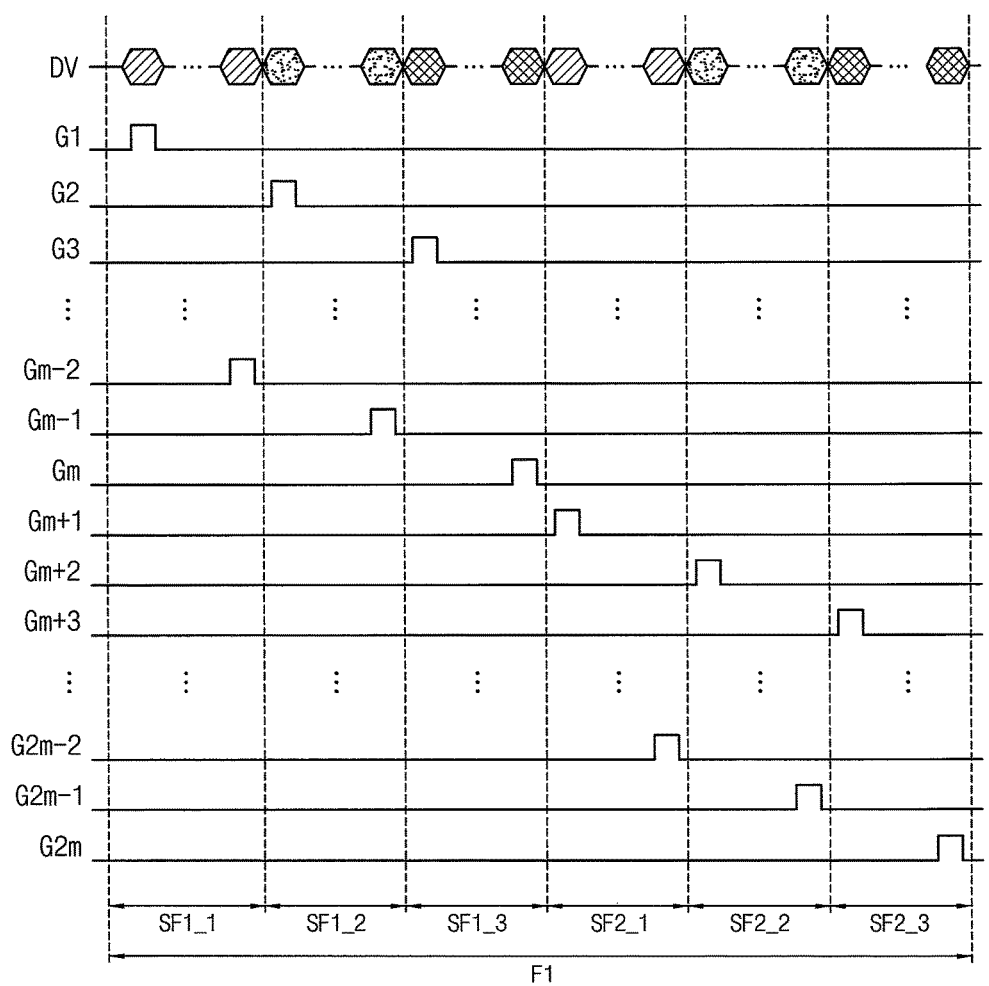
FIG. 10 is a timing diagram illustrating gate signals and data voltages generated in a display apparatus according to an alternative exemplary embodiment.

FIG. 10 is a timing diagram illustrating gate signals and data voltages generated in a display apparatus according to an alternative exemplary embodiment. The same or like elements shown in FIG. 10 have been labeled with the same reference characters as used above to describe the exemplary embodiments of the gate signals and the data voltages described above with reference to FIG. 3, and any repetitive detailed description thereof will hereinafter be omitted or simplified.

Referring to FIGS. 1, 9 and 10, a frame F1 may be divided into a plurality of durations. In one exemplary embodiment, for example, the frame F1 may be divided into first through sixth durations SF1_1, SF1_2, SF1_3, SF2_1, SF2_2, SF2_3. The second duration SF1_2 may be subsequent to the first duration SF1_1, the third duration SF1_3 may be subsequent to the second duration SF1_2, the fourth duration SF2_1 may be subsequent to the third duration SF1_3, the fifth duration SF2_2 may be subsequent to the fourth duration SF2_1, and the sixth duration SF2_3 may be subsequent to the fifth duration SF2_2.

The gate driver 300 may apply the gate signals to gate lines, to which the sub-pixels disposed in the first area A1 are connected, during the first through third durations SF1_1, SF1_2, SF1_3.

The gate driver 300 may sequentially apply the gate signals only to gate lines, to which the first sub-pixels SP1 in the first area A1 are connected, during the first duration SF1_1. In one exemplary embodiment, for example, the gate driver 300 may sequentially apply the gate signals to the first and (m−2)-th gate lines GL1, GLm−2 during the first duration SF1_1. In one exemplary embodiment, for example, the gate driver 300 may apply a first gate signal G1 to the first gate line GL1 during a first horizontal period of the first duration SF1_1, and apply an (m−2)-th gate signal Gm−2 to the (m−2)-th gate line GLm−2 during a final horizontal period of the first duration SF1_1.

The data driver 500 may output data voltages DV corresponding to the first sub-pixels SP1 in the first area A1 during the first duration SF1_1. In such an embodiment, the data driver 500 may output data voltages DV corresponding to the first color during the first duration SF1_1. In one exemplary embodiment, for example, the data driver 500 may output data voltages DV corresponding to first sub-pixels SP1 connected to the first gate line GL1 during the first horizontal period of the first duration SF1_1, and output data voltages DV corresponding to first sub-pixels SP1 connected to the (m−2)-th gate line GLm−2 during the final horizontal period of the first duration SF1_1.

In an exemplary embodiment, the gate driver 300 may sequentially apply the gate signals only to gate lines, to which the second sub-pixels SP2 in the first area A1 are connected, during the second duration SF1_2. In one exemplary embodiment, for example, the gate driver 300 may sequentially apply the gate signals to the second and (m−1)-th gate lines GL2, GLm−1 during the second duration SF1_2. In one exemplary embodiment, for example, the gate driver 300 may apply a second gate signal G2 to the second gate line GL2 during a first horizontal period of the second duration SF1_2, and apply an (m−1)-th gate signal Gm−1 to the (m−1)-th gate line GLm−1 during a final horizontal period of the second duration SF1_2.

The data driver 500 may output data voltages DV corresponding to the second sub-pixels SP2 in the first area A1 during the second duration SF1_2. In such an embodiment, the data driver 500 may output data voltages DV corresponding to the second color during the second duration SF1_2. In one exemplary embodiment, for example, the data driver 500 may output data voltages DV corresponding to second sub-pixels SP2 connected to the second gate line GL2 during the first horizontal period of the second duration SF1_2, and output data voltages DV corresponding to second sub-pixels SP2 connected to the (m−1)-th gate line GLm−1 during the final horizontal period of the second duration SF1_2.

The gate driver 300 may sequentially apply the gate signals only to gate lines to which the third sub-pixels SP3 in the first area A1 are connected during the third duration SF1_3. In one exemplary embodiment, for example, the gate driver 300 may sequentially apply the gate signals to the third and m-th gate lines GL3, . . . , GLm during the third duration SF1_3. In one exemplary embodiment, for example, the gate driver 300 may apply a third gate signal G3 to the third gate line GL3 during a first horizontal period of the third duration SF1_3, and apply an m-th gate signal Gm to the m-th gate line GLm during a final horizontal period of the third duration SF1_3.

The data driver 500 may output data voltages DV corresponding to the third sub-pixels SP3 in the first area A1 during the third duration SF1_3. In such an embodiment, the data driver 500 may output data voltages DV corresponding to the third color during the third duration SF1_3. In one exemplary embodiment, for example, the data driver 500 may output data voltages DV corresponding to third sub-pixels SP3 connected to the third gate line GL3 during the first horizontal period of the third duration SF1_3, and output data voltages DV corresponding to third sub-pixels SP3 connected to the m-th gate line GLm during the final horizontal period of the third duration SF1_3.

The gate driver 300 may apply the gate signals to gate lines, to which the sub-pixels disposed in the second area A2 are connected, during the fourth through sixth durations SF2_1, SF2_2, SF2_3.

The gate driver 300 may sequentially apply the gate signals only to gate lines, to which the first sub-pixels SP1 in the second area A2 are connected, during the fourth duration SF2_1. In one exemplary embodiment, for example, the gate driver 300 may sequentially apply the gate signals to the (m+1)-th and (2m−2)-th gate lines GLm+1, GL2m−2 during the fourth duration SF2_1. In one exemplary embodiment, for example, the gate driver 300 may apply an (m+1)-th gate signal Gm+1 to the (m+1)-th gate line GLm+1 during a first horizontal period of the fourth duration SF2_1, and apply a (2m−2)-th gate signal G2m−2 to the (2m−2)-th gate line GL2m−2 during a final horizontal period of the fourth duration SF2_1.

The data driver 500 may output data voltages DV corresponding to the first sub-pixels SP1 in the second area A2 during the fourth duration SF2_1. In other words, the data driver 500 may output data voltages DV corresponding to the first color during the fourth duration SF2_1. In one exemplary embodiment, for example, the data driver 500 may output data voltages DV corresponding to first sub-pixels SP1 connected to the (m+1)-th gate line GLm+1 during the first horizontal period of the fourth duration SF2_1, and output data voltages DV corresponding to first sub-pixels SP1 connected to the (2m−2)-th gate line GL2m−2 during the final horizontal period of the fourth duration SF2_1.

The gate driver 300 may sequentially apply the gate signals only to gate lines to which the second sub-pixels SP2 in the second area A2 are connected during the fifth duration SF2_2. In one exemplary embodiment, for example, the gate driver 300 may sequentially apply the gate signals to the (m+2)-th and (2m−1)-th gate lines GLm+2, GL2m−1 during the fifth duration SF2_2. In one exemplary embodiment, for example, the gate driver 300 may apply an (m+2)-th gate signal Gm+2 to the (m+2)-th gate line GLm+2 during a first horizontal period of the fifth duration SF2_2, and apply an (2m−1)-th gate signal G2m−1 to the (2m−1)-th gate line GL2m−1 during a final horizontal period of the fifth duration SF2_2.

The data driver 500 may output data voltages DV corresponding to the second sub-pixels SP2 in the second area A2 during the fifth duration SF2_2. In such an embodiment, the data driver 500 may output data voltages DV corresponding to the second color during the fifth duration SF2_2. In one exemplary embodiment, for example, the data driver 500 may output data voltages DV corresponding to second sub-pixels SP2 connected to the (m+2)-th gate line GLm+2 during the first horizontal period of the fifth duration SF2_2, and output data voltages DV corresponding to second sub-pixels SP2 connected to the (2m−1)-th gate line GL2m−1 during the final horizontal period of the fifth duration SF2_2.

The gate driver 300 may sequentially apply the gate signals only to gate lines to which the third sub-pixels SP3 in the second area A2 are connected during the sixth duration SF2_3. In one exemplary embodiment, for example, the gate driver 300 may sequentially apply the gate signals to the (m+3)-th and 2m-th gate lines GLm+3, GL2m during the sixth duration SF2_3. In one exemplary embodiment, for example, the gate driver 300 may apply an (m+3)-th gate signal Gm+3 to the (m+3)-th gate line GLm+3 during a first horizontal period of the sixth duration SF2_3, and apply an 2m-th gate signal G2m to the 2m-th gate line GL2m during a final horizontal period of the sixth duration SF2_3.

The data driver 500 may output data voltages DV corresponding to the third sub-pixels SP3 in the second area A2 during the sixth duration SF2_3. In such an embodiment, the data driver 500 may output data voltages DV corresponding to the third color during the sixth duration SF2_3. In one exemplary embodiment, for example, the data driver 500 may output data voltages DV corresponding to third sub-pixels SP3 connected to the (m+3)-th gate line GLm+3 during the first horizontal period of the sixth duration SF2_3, and output data voltages DV corresponding to third sub-pixels SP3 connected to the 2m-th gate line GL2m during the final horizontal period of the sixth duration SF2_3.

Such operations may be repeated every frame. Such operations may be performed with dividing the display panel 100 into more than two areas.

Figure 11A:
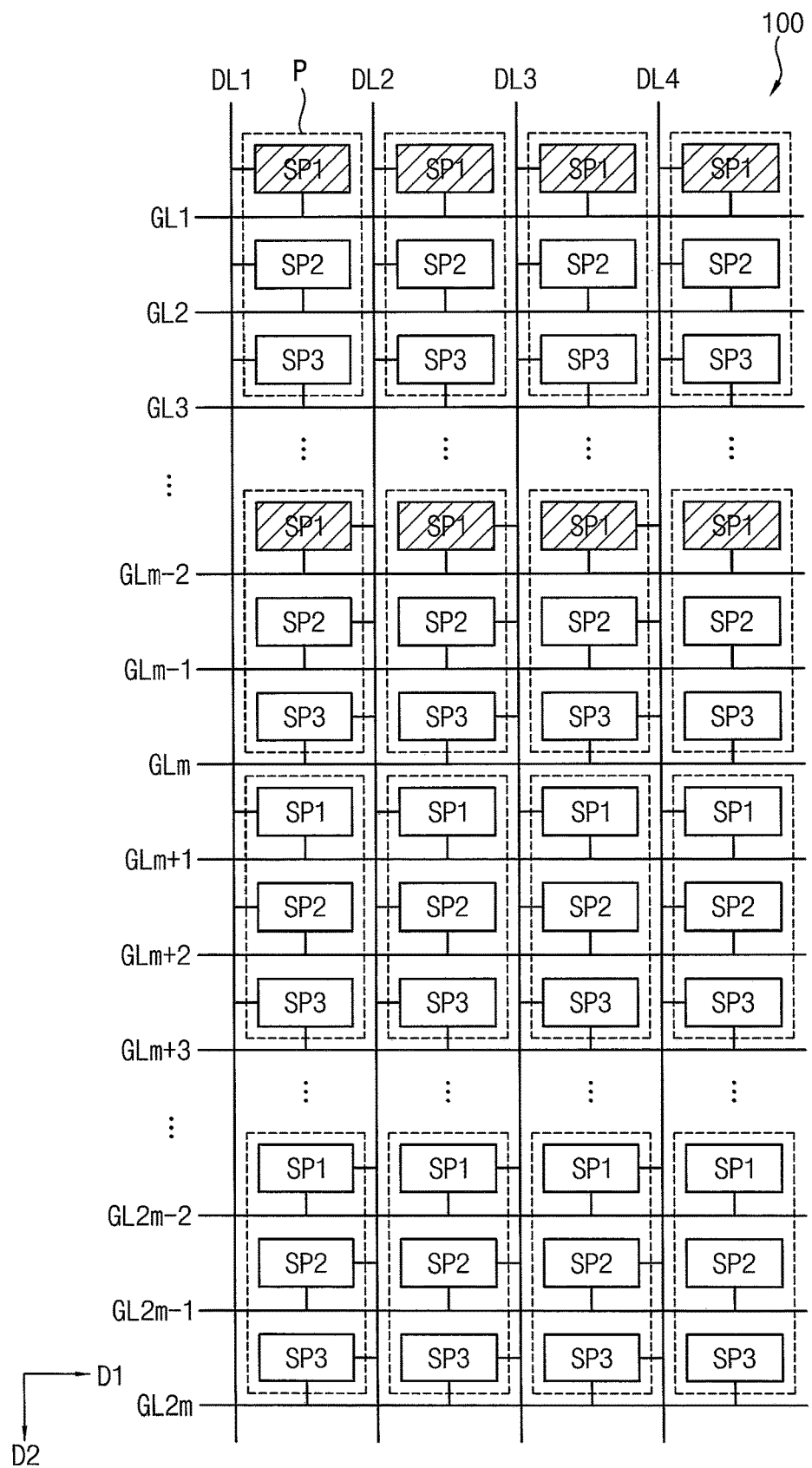
FIG. 11A is a diagram illustrating a portion of a display panel included in a display apparatus during a first duration SF1_1 of FIG. 10 according to an exemplary embodiment.
Figure 11B:
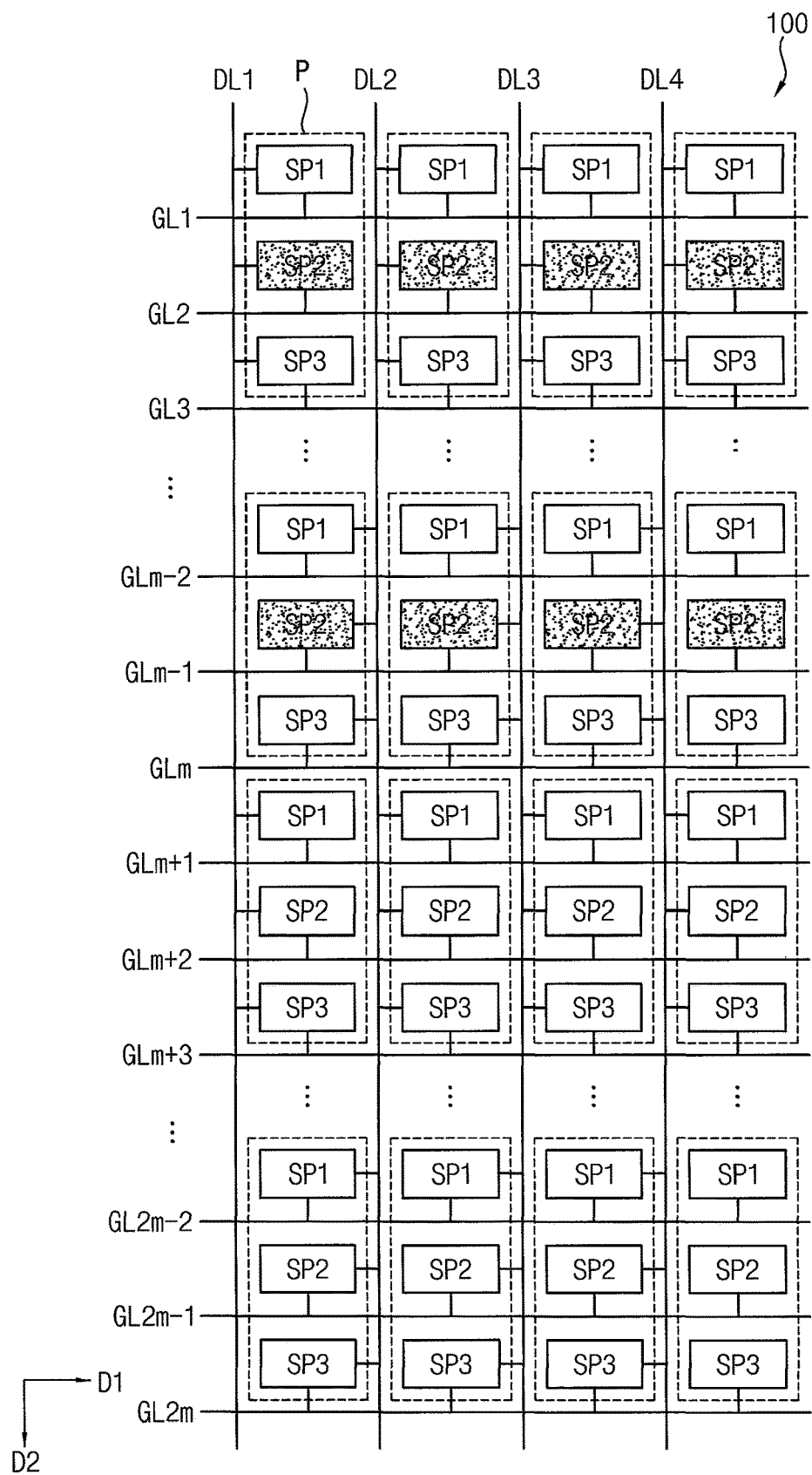
FIG. 11B is a diagram illustrating a portion of a display panel included in a display apparatus during a second duration SF1_2 of FIG. 10 according to an exemplary embodiment.
Figure 11C:
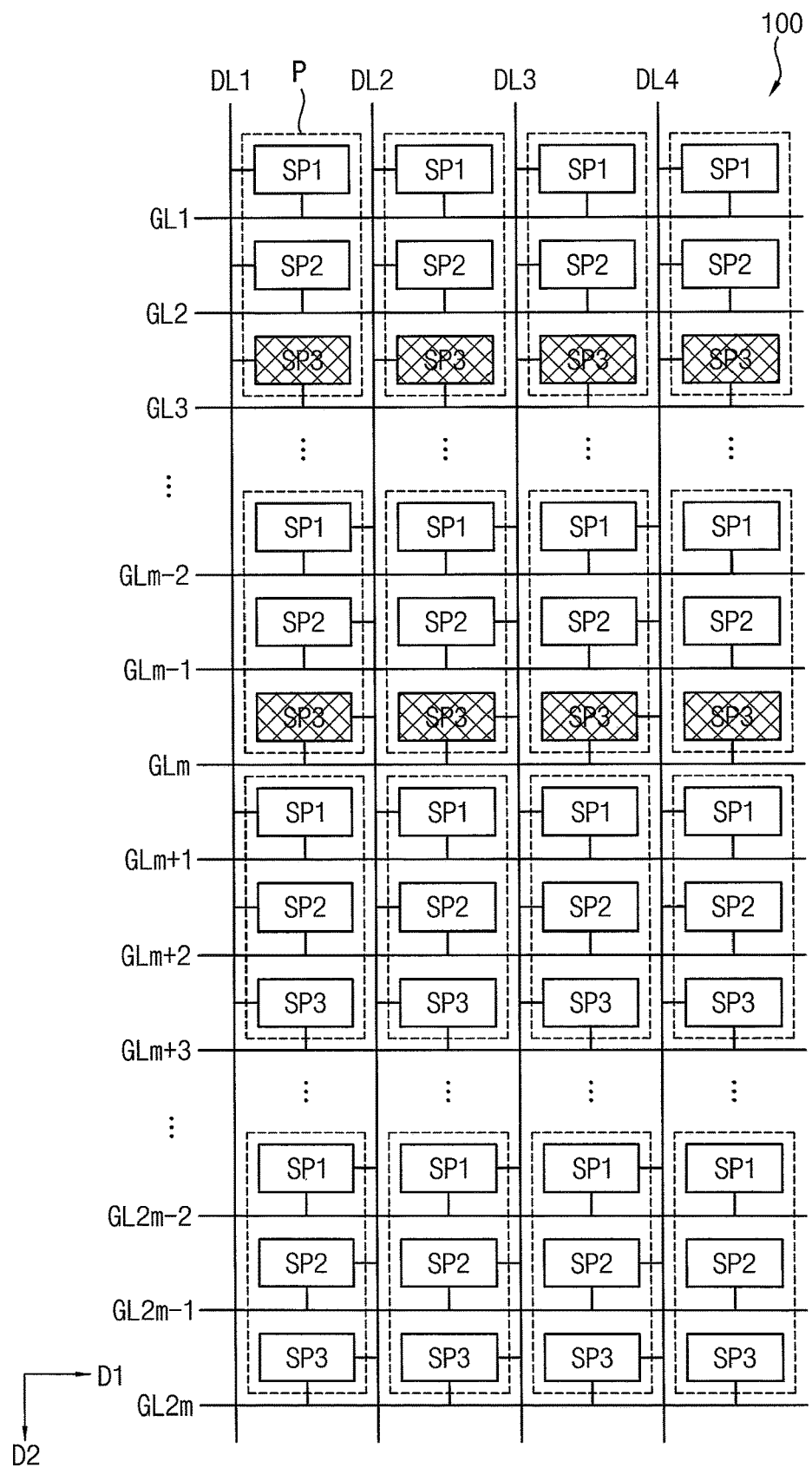
FIG. 11C is a diagram illustrating a portion of a display panel included in a display apparatus during a third duration SF1_3 of FIG. 10 according to an exemplary embodiment.
Figure 11D:
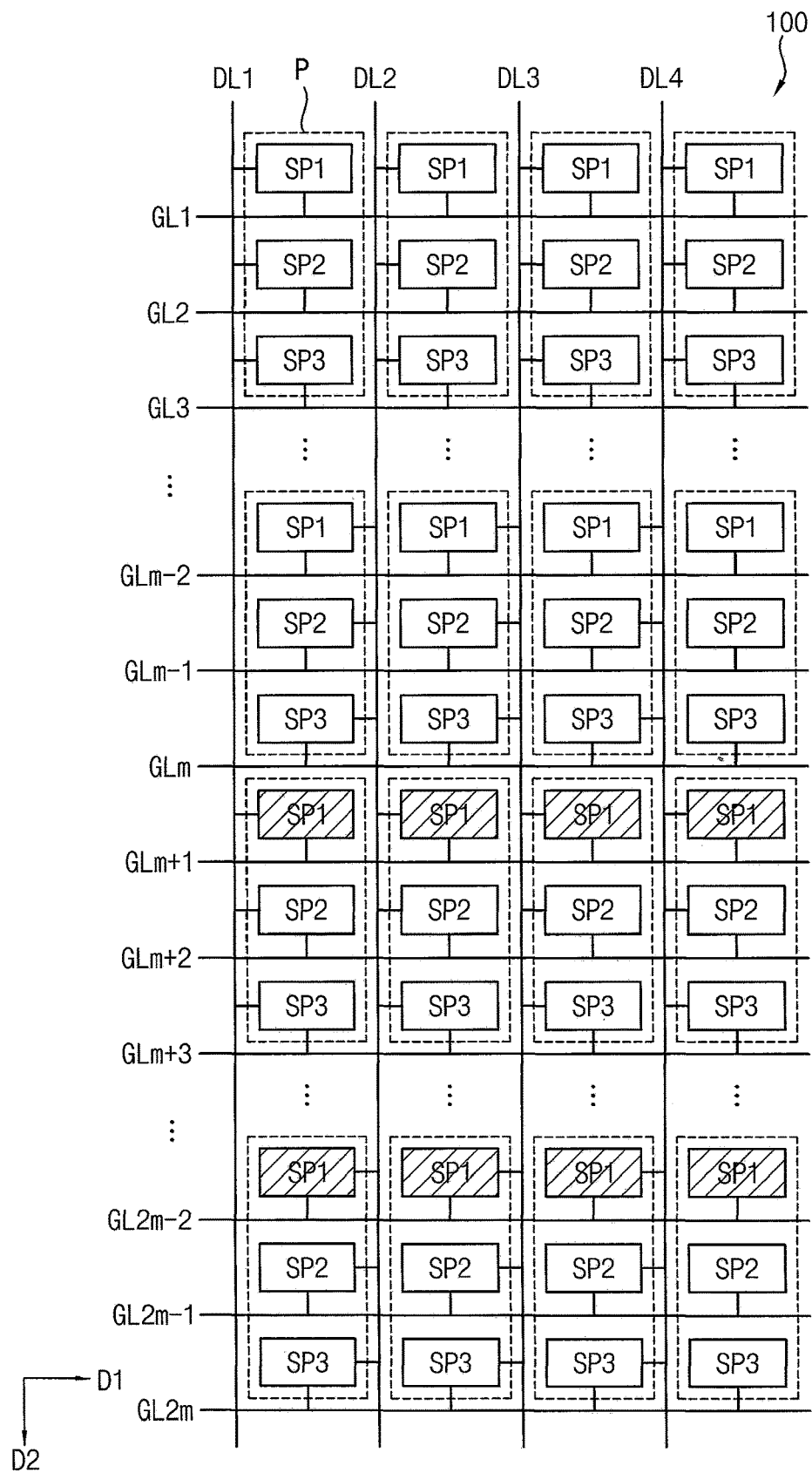
FIG. 11D is a diagram illustrating a portion of a display panel included in a display apparatus during a fourth duration SF2_1 of FIG. 10 according to an exemplary embodiment.
Figure 11E:
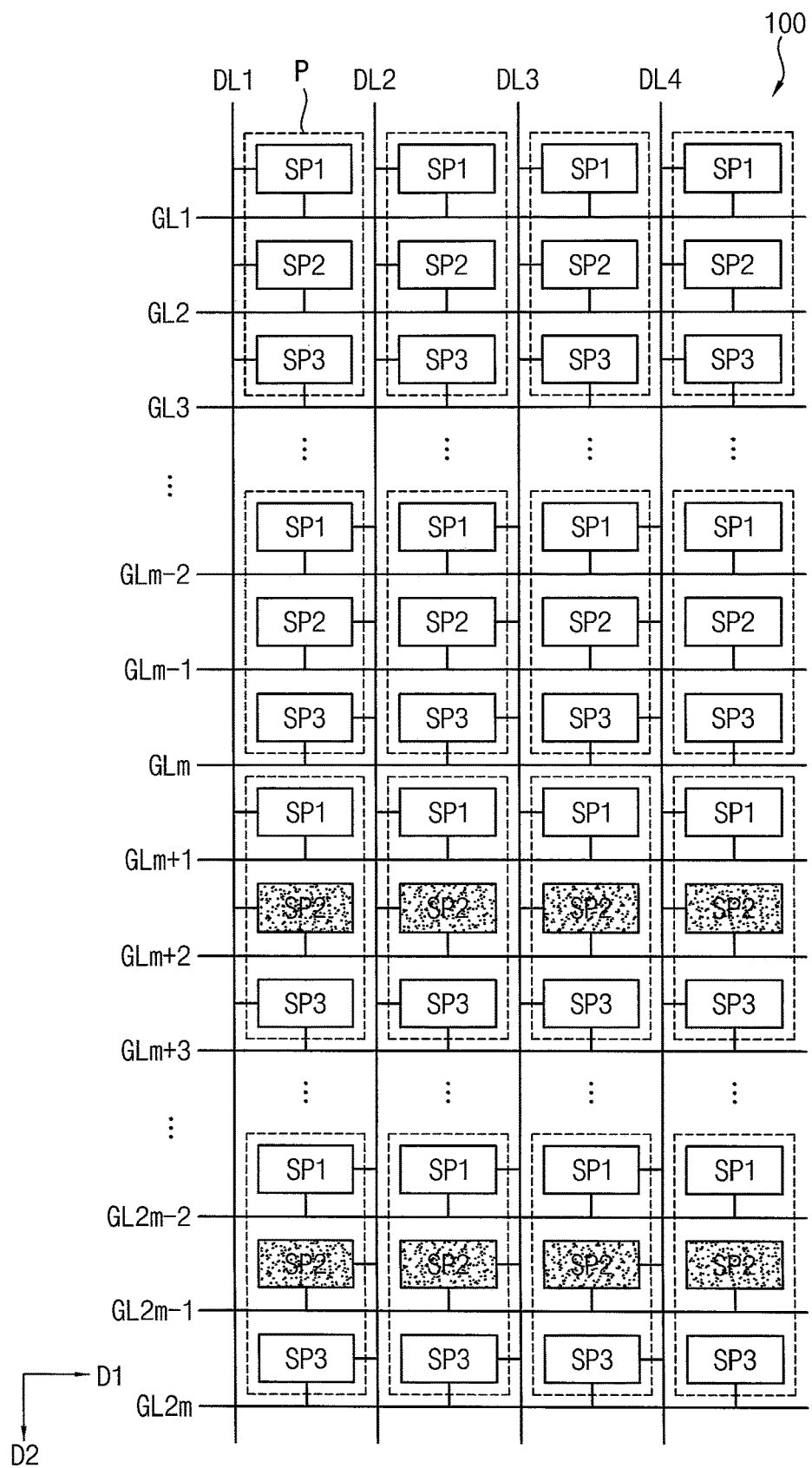
FIG. 11E is a diagram illustrating a portion of a display panel included in a display apparatus during a fifth duration SF2_2 of FIG. 10 according to an exemplary embodiment.
Figure 11F:
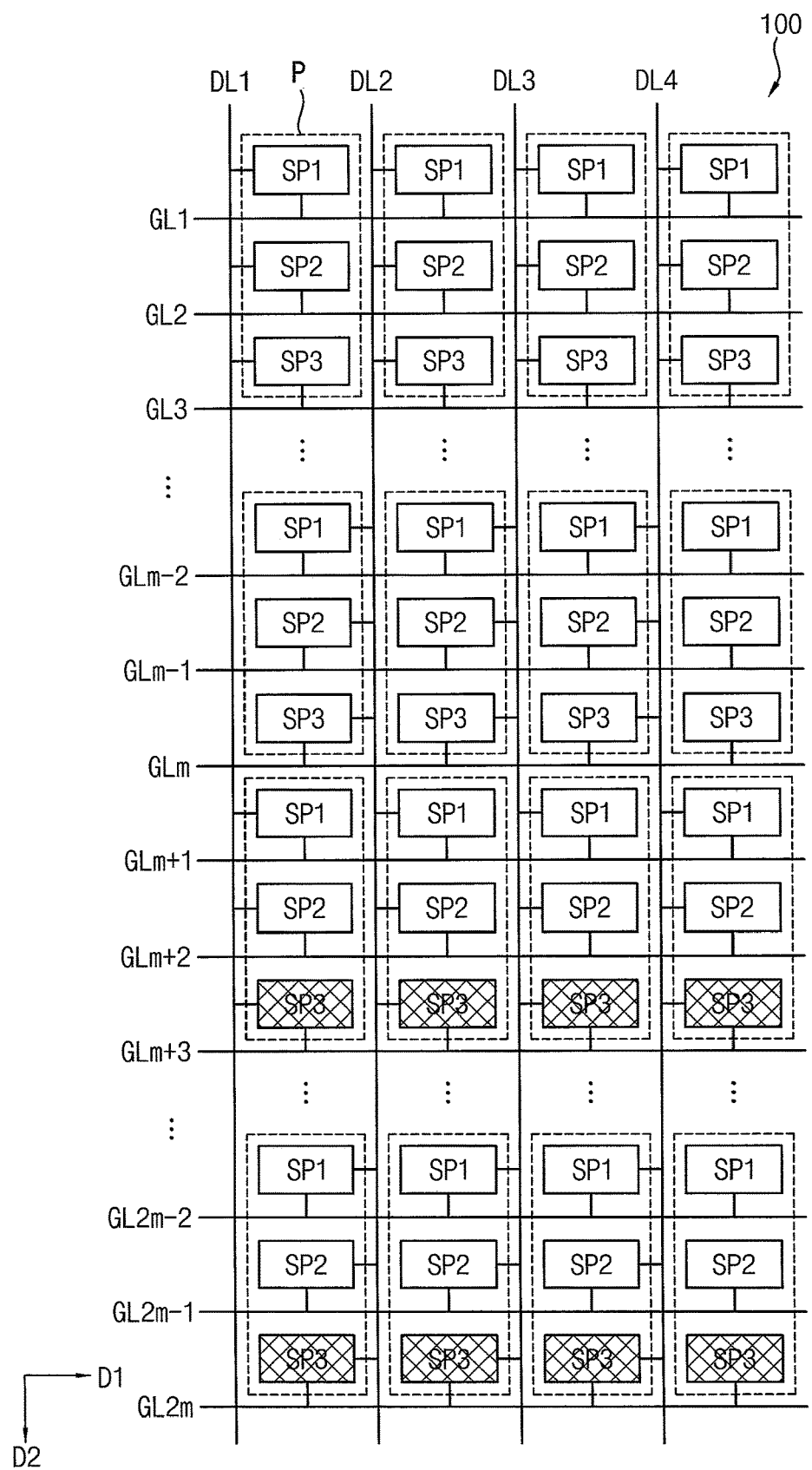
FIG. 11F is a diagram illustrating a portion of a display panel included in a display apparatus during a sixth duration SF2_3 of FIG. 10 according to an exemplary embodiment.

FIG. 11A is a diagram illustrating a portion of a display panel included in a display apparatus during a first duration SF1_1 of FIG. 10 according to an exemplary embodiment. FIG. 11B is a diagram illustrating a portion of a display panel included in a display apparatus during a second duration SF1_2 of FIG. 10 according to an exemplary embodiment. FIG. 11C is a diagram illustrating a portion of a display panel included in a display apparatus during a third duration SF1_3 of FIG. 10 according to an exemplary embodiment. FIG. 11D is a diagram illustrating a portion of a display panel included in a display apparatus during a fourth duration SF2_1 of FIG. 10 according to an exemplary embodiment. FIG. 11E is a diagram illustrating a portion of a display panel included in a display apparatus during a fifth duration SF2_2 of FIG. 10 according to an exemplary embodiment. FIG. 11F is a diagram illustrating a portion of a display panel included in a display apparatus during a sixth duration SF2_3 of FIG. 10 according to an exemplary embodiment. The same or like elements shown in FIGS. 11A through 11F have been labeled with the same reference characters as used above to describe the exemplary embodiments described above with reference to FIGS. 4A through 4C, and any repetitive detailed description thereof will hereinafter be omitted or simplified.

Referring to FIGS. 1, 9, 10 and 11A, only the first sub-pixels SP1 configured to display the first color in the first area A1 are driven during the first duration SF1_1.

Referring to FIGS. 1, 9, 10 and 11B, only the second sub-pixels SP2 configured to display the second color in the first area A1 are driven during the second duration SF1_2.

Referring to FIGS. 1, 9, 10 and 11C, only the third sub-pixels SP3 configured to display the third color in the first area A1 are driven during the third duration SF1_3.

Referring to FIGS. 1, 9, 10 and 11D, only the first sub-pixels SP1 configured to display the first color in the second area A2 are driven during the fourth duration SF2_1.

Referring to FIGS. 1, 9, 10 and 11E, only the second sub-pixels SP2 configured to display the second color in the second area A2 are driven during the fifth duration SF2_2.

Referring to FIGS. 1, 9, 10 and 11F, only the third sub-pixels SP3 configured to display the third color in the second area A2 are driven during the sixth duration SF2_3.

Referring to FIGS. 1, 5A, 5B, 9 and 10, in an exemplary embodiment, the gamma reference voltage generator 400 may generate a first gamma reference voltage based on the first gamma curve VG1_U, VG1_L corresponding to the first and fourth durations SF1_1, SF2_1. The data driver 500 may generate first data voltages corresponding to the first sub-pixels SP1 based on the first gamma reference voltage during the first and fourth durations SF1_1, SF2_1 to output the first data voltages to the data lines DL.

The gamma reference voltage generator 400 may generate a second gamma reference voltage based on the second gamma curve VG2_U, VG2_L corresponding to the second and fifth durations SF1_2, SF2_2. The data driver 500 may generate second data voltages corresponding to the second sub-pixels SP2 based on the second gamma reference voltage during the second and fifth durations SF1_2, SF2_2 to output the second data voltages to the data lines DL.

The gamma reference voltage generator 400 may generate a third gamma reference voltage based on the third gamma curve VG3_U, VG3_L corresponding to the third and sixth durations SF1_3, SF2_3. The data driver 500 may generate third data voltages corresponding to the third sub-pixels SP3 based on the third gamma reference voltage during the third and sixth durations SF1_3, SF2_3 to output the third data voltages to the data lines DL.

Figure 12:
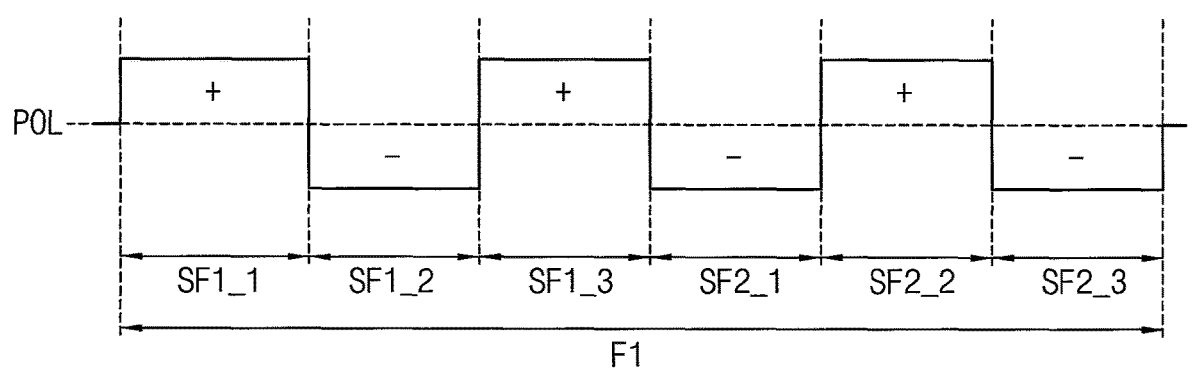
FIG. 12 is a timing diagram illustrating a polarity of data voltages in each duration in a display apparatus according to an alternative exemplary embodiment.

FIG. 12 is a timing diagram illustrating a polarity of data voltages in each duration in a display apparatus according to an exemplary embodiment.

Referring to FIGS. 1, 9, 10 and 12, in an exemplary embodiment, a polarity POL of the data voltages may be inverted every duration in a frame F1. In one exemplary embodiment, for example, a polarity of data voltages outputted during the first duration SF1_1 may be positive (+), a polarity of data voltages outputted during the second duration SF1_2 may be negative (−), a polarity of data voltages outputted during the third duration SF1_3 may be positive (+), a polarity of data voltages outputted during the fourth duration SF2_1 may be negative (−), a polarity of data voltages outputted during the fifth duration SF2_2 may be positive (+), and a polarity of data voltages outputted during the sixth duration SF2_3 may be negative (−), as shown in FIG. 12.

Figure 13:
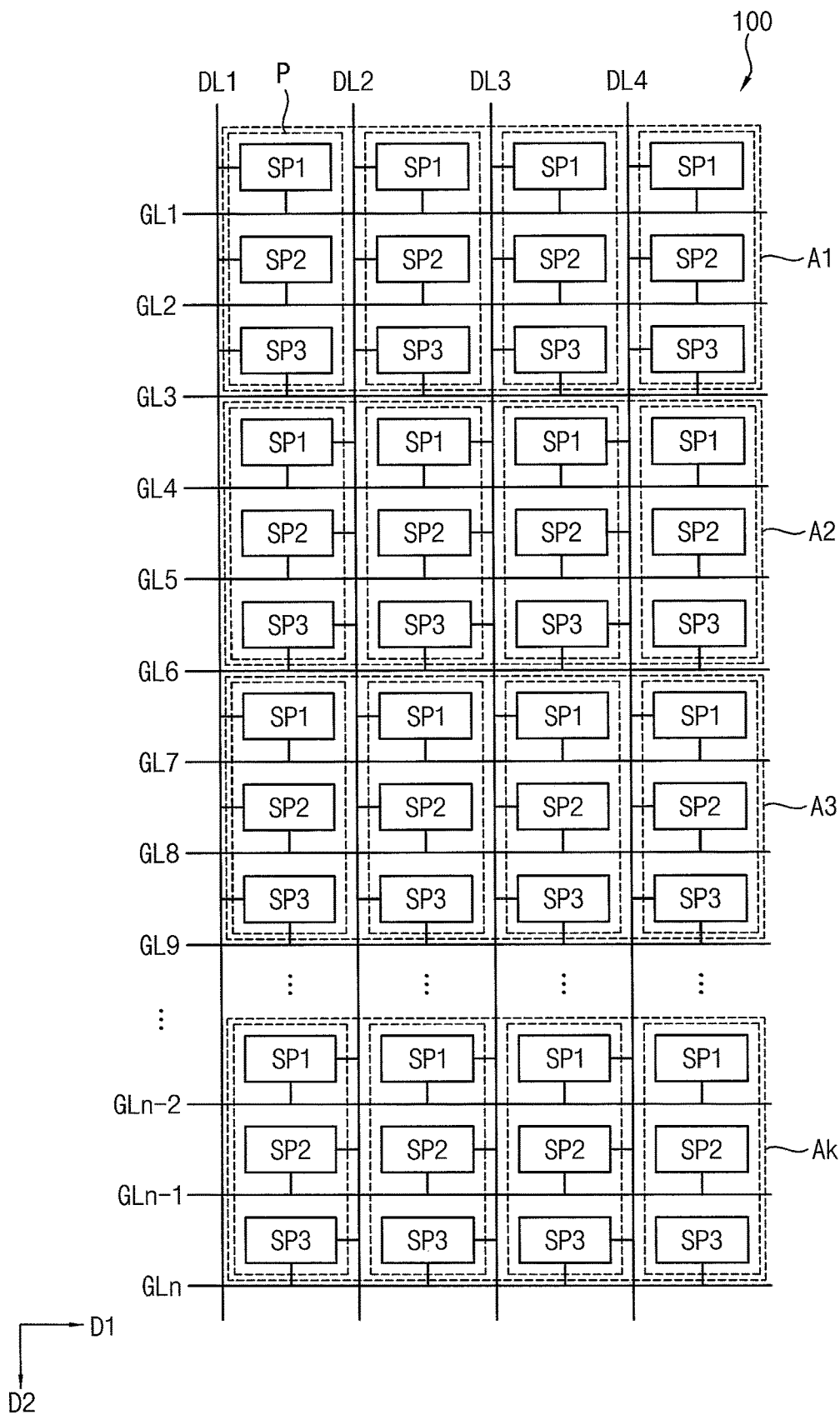
FIG. 13 is a diagram illustrating a portion of a display panel included in a display apparatus according to an exemplary embodiment.

FIG. 13 is a diagram illustrating a portion of a display panel included in a display apparatus according to an exemplary embodiment. The same or like elements shown in FIG. 13 have been labeled with the same reference characters as used above to describe the exemplary embodiments of the gate signals and the data voltages described above with reference to FIGS. 2 and 9, and any repetitive detailed description thereof will hereinafter be omitted or simplified.

Referring to FIGS. 1 and 13, the display panel 100 may be divided into a plurality of areas. In one exemplary embodiment, for example, the display panel 100 may be divided into first through k-th areas A1-Ak.

In such an embodiment, sub-pixels connected to first through third gate lines GL1-GL3 may be disposed in the first area A1. Sub-pixels connected to fourth through sixth gate lines GL4-GL6 may be disposed in the second area A2.

Sub-pixels connected to seventh through ninth gate lines GL7-GL9 may be disposed in the third area A3. Sub-pixels connected to (n−2)-th through n-th gate lines GL1-GLn may be disposed in the k-th area Ak. In such an embodiment, one unit pixel row arranged along the first direction is disposed in each of the first through k-th areas A1-Ak.

Figure 14:
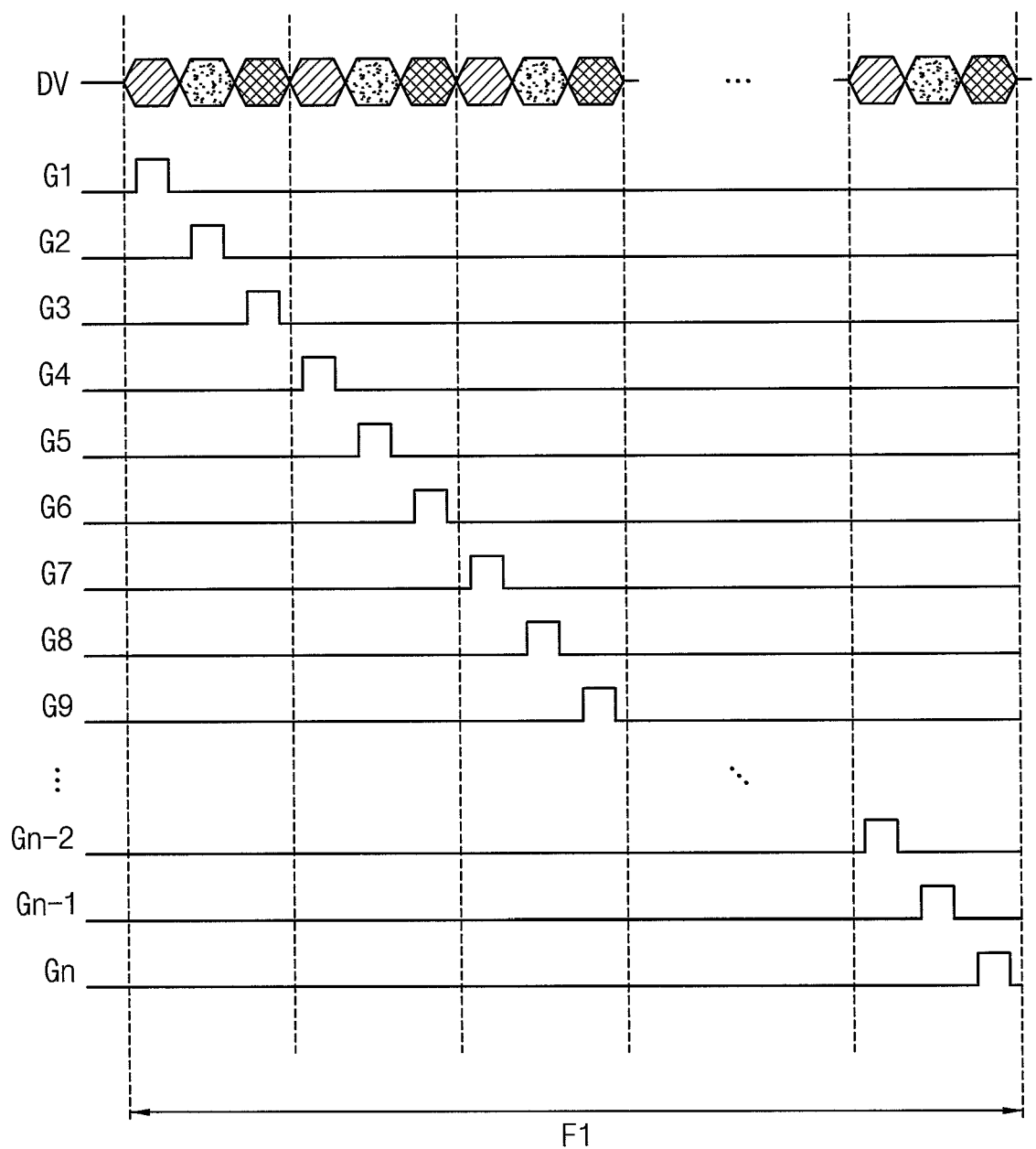
FIG. 14 is a timing diagram illustrating gate signals and data voltages generated in a display apparatus according to another alternative exemplary embodiment.

FIG. 14 is a timing diagram illustrating gate signals and data voltages generated in a display apparatus according to another alternative exemplary embodiment. The same or like elements shown in FIG. 14 have been labeled with the same reference characters as used above to describe the exemplary embodiments of the gate signals and the data voltages described above with reference to FIGS. 3 and 10, and any repetitive detailed description thereof will hereinafter be omitted or simplified.

Referring to FIGS. 1, 13 and 14, a frame F1 may be divided into a plurality of durations. Each of the durations may be horizontal periods corresponding to one unit pixel row. A horizontal period is a duration while data voltages DV are charged for one sub-pixel row. In one exemplary embodiment, for example, when the unit pixel P includes three sub-pixels SP1, SP2, SP3 arranged along the second direction D2, each of the durations may be substantially equal to three horizontal periods.

The gate driver 300 may sequentially apply gate signals G1, G2, G3 to first, second and third gate lines GL1, GL2, GL3 during a first duration of the durations.

The data driver 500 may sequentially output data voltages DV corresponding to first sub-pixels SP1 connected to the first gate line GL1, data voltages DV corresponding to second sub-pixels SP2 connected to the second gate line GL2 and data voltages DV corresponding to third sub-pixels SP3 connected to the third gate line GL3, during the first duration.

The gate driver 300 may sequentially apply gate signals G4, G5, G6 to fourth, fifth and sixth gate lines GL4, GL5, GL6 during a second duration of the durations.

The data driver 500 may sequentially output data voltages DV corresponding to first sub-pixels SP1 connected to the fourth gate line GL4, data voltages DV corresponding to second sub-pixels SP2 connected to the fifth gate line GL5 and data voltages DV corresponding to third sub-pixels SP3 connected to the sixth gate line GL6, during the second duration.

The gate driver 300 may sequentially apply gate signals G7, G8, G9 to seventh, eighth and ninth gate lines GL7, GL8, GL8 during a third duration of the durations.

The data driver 500 may sequentially output data voltages DV corresponding to first sub-pixels SP1 connected to the seventh gate line GL7, data voltages DV corresponding to second sub-pixels SP2 connected to the eighth gate line GL8 and data voltages DV corresponding to third sub-pixels SP3 connected to the ninth gate line GL9 during the third duration.

The gate driver 300 may sequentially apply gate signals Gn−2, Gn−1, Gn to (n−2)-th, (n−1)-th and n-th gate lines GLn−2, GLn−1, GLn during a k-th duration of the durations.

The data driver 500 may sequentially output data voltages DV corresponding to first sub-pixels SP1 connected to the (n−2)-th gate line GLn−2, data voltages DV corresponding to second sub-pixels SP2 connected to the (n−1)-th gate line GLn−1, and data voltages DV corresponding to third sub-pixels SP3 connected to the n-th gate line GLn during the k-th duration.

Such operations may be repeated every frame.

Figure 15A:
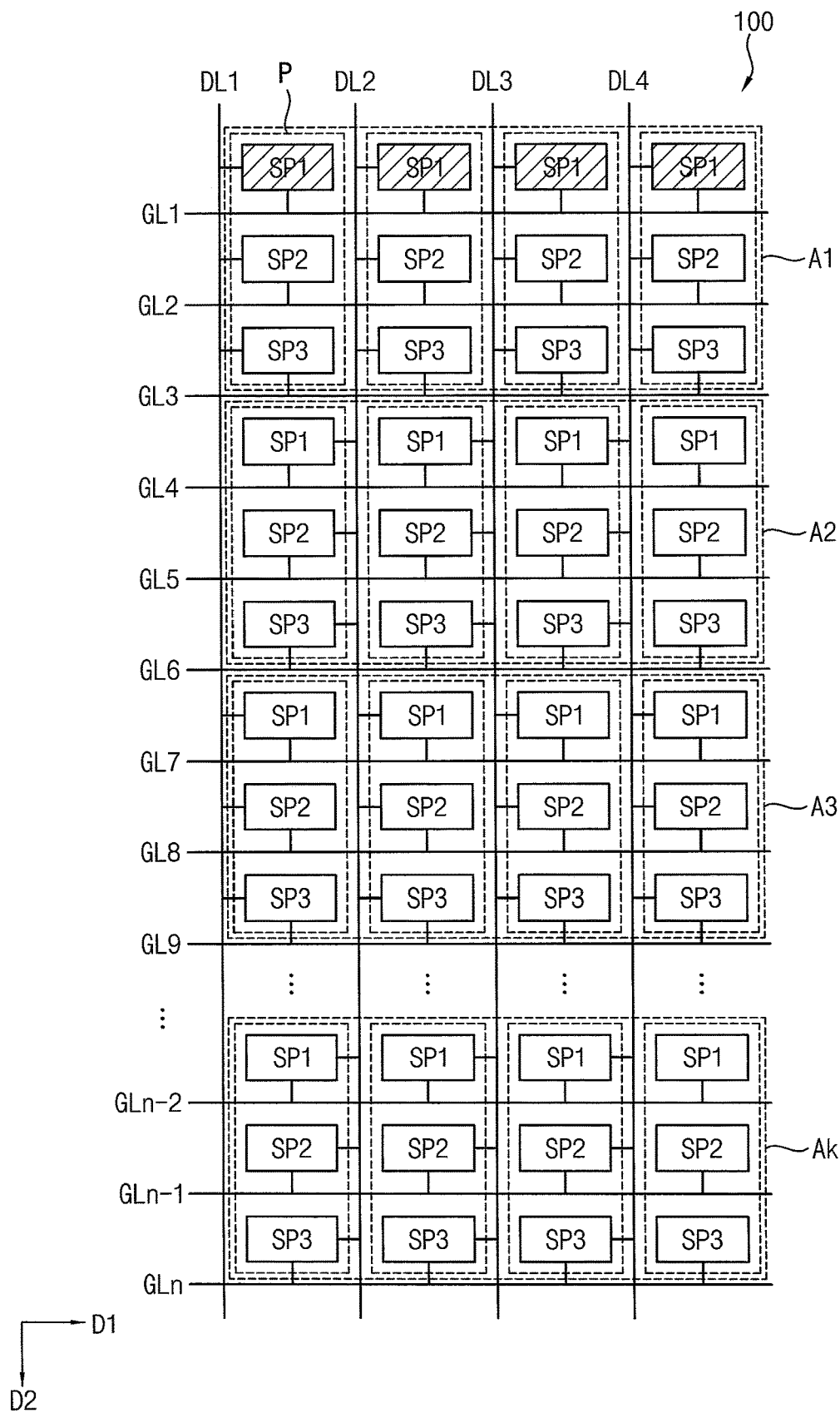
FIG. 15A is a diagram illustrating a portion of a display panel included in a display apparatus during a first horizontal period of FIG. 14 according to an exemplary embodiment.
Figure 15B:
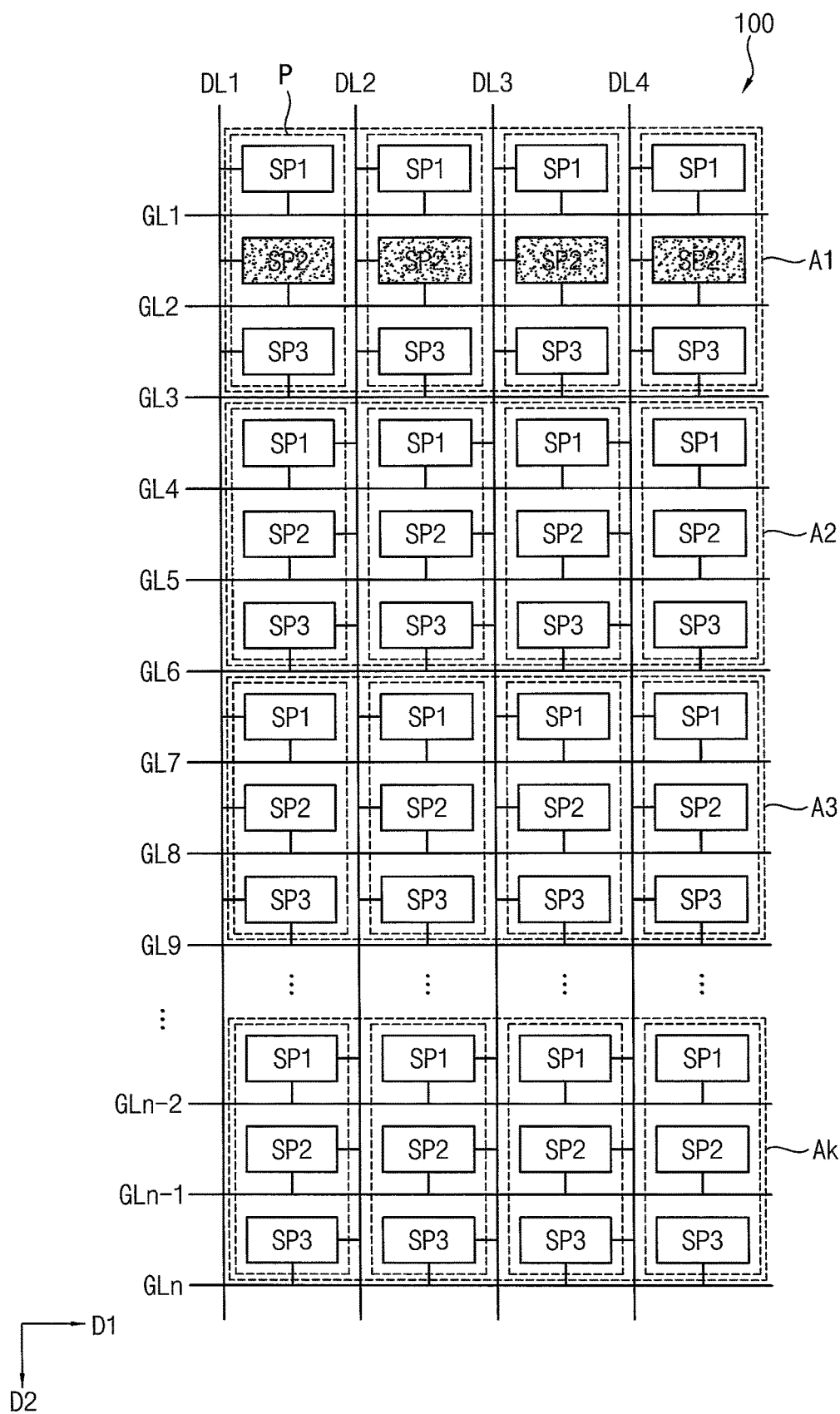
FIG. 15B is a diagram illustrating a portion of a display panel included in a display apparatus during a second horizontal period of FIG. 14 according to an exemplary embodiment.
Figure 15C:
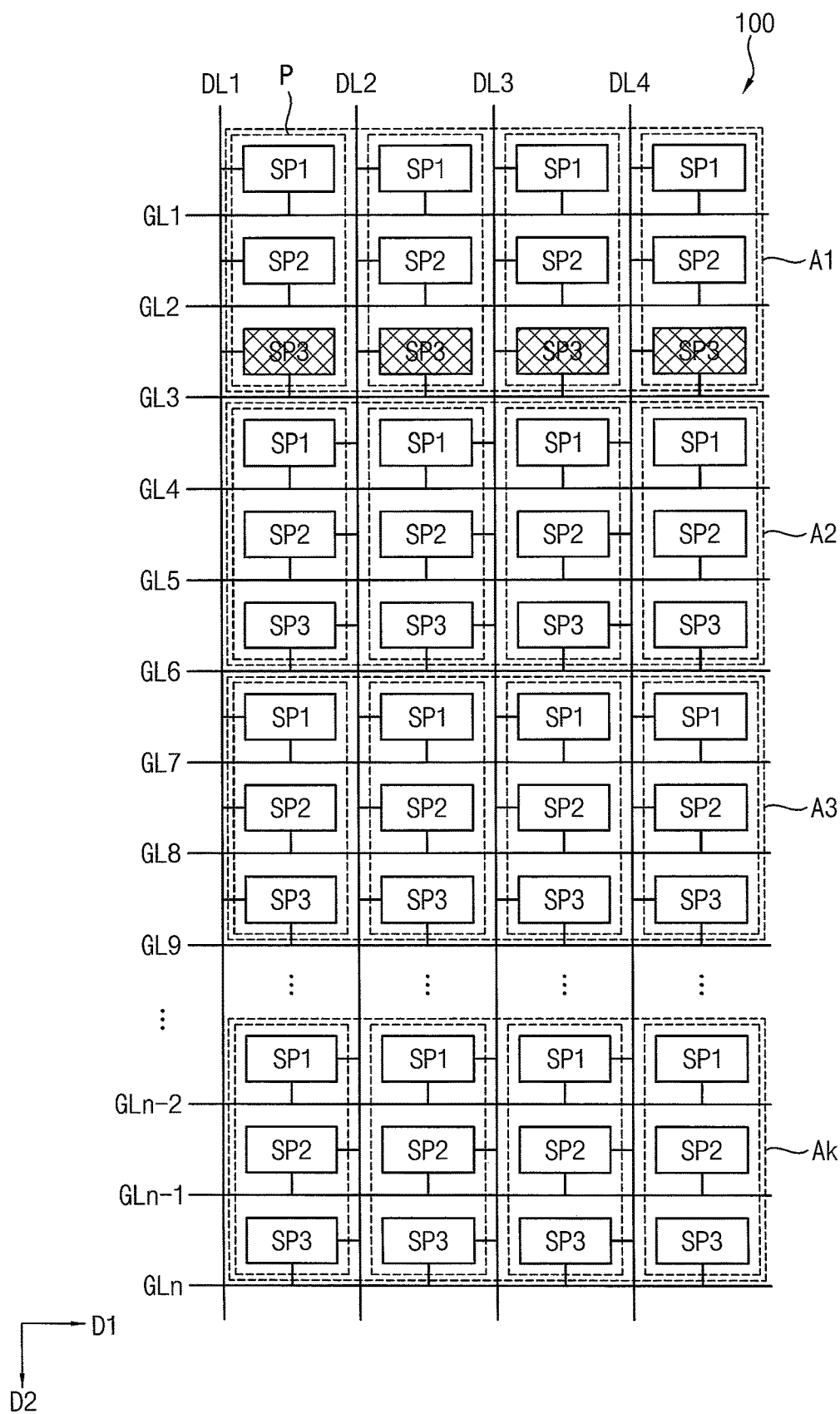
FIG. 15C is a diagram illustrating a portion of a display panel included in a display apparatus during a third horizontal period of FIG. 14 according to an exemplary embodiment.

FIG. 15A is a diagram illustrating a portion of a display panel included in a display apparatus during a first horizontal period of FIG. 14 according to an exemplary embodiment. FIG. 15B is a diagram illustrating a portion of a display panel included in a display apparatus during a second horizontal period of FIG. 14 according to an exemplary embodiment. FIG. 15C is a diagram illustrating a portion of a display panel included in a display apparatus during a third horizontal period of FIG. 14 according to an exemplary embodiment. The same or like elements shown in FIGS. 15A through 15c have been labeled with the same reference characters as used above to describe the exemplary embodiments described above with reference to FIGS. 4A through 4C and 11A through 11F, and any repetitive detailed description thereof will hereinafter be omitted or simplified.

Referring to FIGS. 1, 13, 14 and 15A, only the first sub-pixels SP1 configured to display the first color in the first area A1 are driven during a first horizontal period of the first duration.

Referring to FIGS. 1, 13, 14 and 15B, only the second sub-pixels SP2 configured to display the second color in the first area A1 are driven during a second horizontal period of the first duration.

Referring to FIGS. 1, 13, 14 and 15C, only the third sub-pixels SP3 configured to display the third color in the first area A1 are driven during a third horizontal period of the first duration.

These operations may be repeated for the second through k-th areas A2-Ak after the first duration.

Referring to FIGS. 1, 5A, 5B, 13 and 14, the gamma reference voltage generator 400 may generate a first gamma reference voltage based on the first gamma curve VG1_U, VG1_L corresponding to a first horizontal period of each of the durations. The data driver 500 may generate first data voltages corresponding to the first sub-pixels SP1 based on the first gamma reference voltage during the first horizontal period of each of the durations to output the first data voltages to the data lines DL.

The gamma reference voltage generator 400 may generate a second gamma reference voltage based on the second gamma curve VG2_U, VG2_L corresponding to a second horizontal period of each of the durations. The data driver 500 may generate second data voltages corresponding to the second sub-pixels SP2 based on the second gamma reference voltage during the second horizontal period of each of the durations to output the second data voltages to the data lines DL.

The gamma reference voltage generator 400 may generate a third gamma reference voltage based on the third gamma curve VG3_U, VG3_L corresponding to a third horizontal period of each of the durations. The data driver 500 may generate third data voltages corresponding to the third sub-pixels SP3 based on the third gamma reference voltage during the third horizontal period of each of the durations to output the third data voltages to the data lines DL.

The exemplary embodiments described herein may be used in a display apparatus and/or a system including the display apparatus, such as a mobile phone, a smart phone, a personal digital assistant ("PDA"), a portable multimedia player ("PMP"), a digital camera, a digital television, a set-top box, a music player, a portable game console, a navigation device, a personal computer ("PC"), a server computer, a workstation, a tablet computer, a laptop computer, a smart card, a printer, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display apparatus comprising:
a display panel which displays an image, wherein the display panel comprises:
first sub-pixels which display a first color;
second sub-pixels which display a second color different from the first color;
a plurality of first gate lines to which only the first sub-pixels are connected;
a plurality of second gate lines to which only the second sub-pixels are connected; and
data lines;
a gate driver which sequentially applies first gate signals only to the first gate lines during a first duration of a first frame, and sequentially applies second gate signals only to the second gate lines during a second duration of the first frame, wherein the second duration is subsequent to the first duration;
a data driver which outputs data voltages to the data lines based on input image data in synchronization with a driving sequence of the first and second gate lines;
a gamma reference voltage generator connected to the data driver and which generates a first gamma reference voltage based on a first gamma curve, and generates a second gamma reference voltage based on a second gamma curve different from the first gamma curve,
wherein the data driver which outputs first data voltages generated based on the first gamma reference voltage during the first duration, and outputs second data voltages generated based on the second gamma reference voltage during the second duration.

2. The display apparatus of claim 1, further comprising:
a common voltage generator which outputs a common voltage to the display panel,
wherein when a first optimum common voltage to display the first color or a second optimum common voltage to display the second color is higher than the common voltage, the first gamma curve or the second gamma curve has lower voltages than a reference gamma curve has, and
when the first optimum common voltage or the second optimum common voltage is lower than the common voltage, the first gamma curve or the second gamma curve has higher voltages than the reference gamma curve has.

3. The display apparatus of claim 2, wherein
when the first optimum common voltage is higher than the second optimum common voltage, the first gamma curve has lower voltages than the second gamma curve has, and
when the first optimum common voltage is lower than the second optimum common voltage, the first gamma curve has higher voltages than the second gamma curve has.

4. The display apparatus of claim 1, wherein
a unit pixel is collectively defined by a first sub-pixel of the first sub-pixels and a second sub-pixel of the second sub-pixel,
wherein the first sub-pixel and the second sub-pixel of the unit pixel are adjacent to each other along the data lines.

5. The display apparatus of claim 4, wherein the display panel further comprises:
a first unit pixel and a second unit pixel, which are adjacent to each other and disposed between a first data line and a second data line of the data lines,
the first data line and the second data line are adjacent to each other,
the first unit pixel is connected to the first data line, and
the second unit pixel is connected to the second data line.

6. The display apparatus of claim 4, wherein the display panel further comprises:
a first unit pixel and a second unit pixel, which are adjacent to each other and disposed between a first data line and a second data line of the data lines,
wherein the first data line and the second data line are adjacent to each other,
wherein the first unit pixel and the second unit pixel are connected to the first data line.

7. The display apparatus of claim 1, wherein
the data driver outputs first data voltages corresponding to the first sub-pixels during the first duration, and
the data driver outputs second data voltages corresponding to the second sub-pixels during the second duration.

8. The display apparatus of claim 7, wherein a polarity of the second data voltages is opposite to a polarity of the first data voltages.

9. The display apparatus of claim 1, wherein polarities of data voltages applied to data lines adjacent to each other are opposite to each other in the first frame.

10. The display apparatus of claim 1, wherein the display panel further comprises:
third sub-pixels which displays a third color different from the first and second colors; and
a plurality of third gate lines to which only the third sub-pixels are connected,
wherein the gate driver sequentially applies third gate signals only to the third gate lines during a third duration of the first frame, and
the third duration is subsequent to the second duration.

11. The display apparatus of claim 1, wherein
the display panel is divided into a first are and a second area,
the display panel further comprises:
a plurality of third gate lines to which only the first sub-pixels are connected; and
a plurality of fourth gate lines to which only the second sub-pixels are connected,
wherein the first and second gate lines are disposed in the first area,
wherein the third and fourth gate lines are disposed in the second area,
wherein the gate driver sequentially applies third gate signals only to the third gate lines during a third duration of the first frame, and sequentially applies fourth gate signals only to the fourth gate lines during a fourth duration of the first frame,
wherein the third duration is subsequent to the second duration, and
wherein the fourth duration being subsequent to the third duration.

12. The display apparatus of claim 11, further comprising:
a gamma reference voltage generator which generates a first gamma reference voltage based on a first gamma curve, and generates a second gamma reference voltage based on a second gamma curve different from the first gamma curve,
wherein the data driver outputs first data voltages generated based on the first gamma reference voltage during the first and third durations, and outputs second data voltages generated based on the second gamma reference voltage during the second and fourth durations.

13. The display apparatus of claim 11, wherein
the data driver outputs first data voltages corresponding to the first sub-pixels during the first and third durations, and
the data driver output second data voltages corresponding to the second sub-pixels during the second and fourth durations.

14. The display apparatus of claim 11, wherein the display panel further comprises:
third sub-pixels which display a third color different from the first and second colors;
a plurality of fifth gate lines to which only the third sub-pixels are connected, the fifth gate lines being disposed in the first area; and
a plurality of sixth gate lines to which only the third sub-pixels are connected, the sixth gate lines being disposed in the second area,
wherein the gate driver sequentially applies fifth gate signals only to the fifth gate lines during a fifth duration of the first frame, and sequentially applies sixth gate signals only to the sixth gate lines during a sixth duration of the first frame,
wherein the fifth duration is between the second duration and the third duration, and
wherein the sixth duration is subsequent to the fourth duration.

15. A display apparatus comprising:
a display panel which displays an image, wherein the display panel comprises:
first sub-pixels which display a first color;
second sub-pixels which display a second color different from the first color;
a first gate line to which only the first sub-pixels are connected;
a second gate line to which only the second sub-pixels are connected; and
data lines;
a gate driver which applies first and second gate signals to the first and second gate lines respectively;
a gamma reference voltage generator which generates a first gamma reference voltage based on a first gamma curve, and generates a second gamma reference voltage based on a second gamma curve different from the first gamma curve; and
a data driver connected to the gamma reference voltage generator and which outputs first data voltages generated based on the first gamma reference voltage in synchronization with the first gate signal and second data voltages generated based on the second gamma reference voltage in synchronization with the second gate signal, to the data lines based on input image data.

16. A method of driving a display apparatus comprising a plurality of first gate lines and a plurality of second gate lines connected to a gate driver, wherein only first sub-pixels are connected to the first gate lines, only second sub-pixels are connected to the second gate lines, the first sub-pixels display a first color, and the second sub-pixels display a second color different from the first color, the method comprising:

sequentially applying first gate signals only to the first gate lines during a first duration of a first frame;

sequentially applying second gate signals only to the second gate lines during a second duration of the first frame, wherein the second duration is subsequent to the first duration;

outputting data voltages via data lines connected to a data driver, the data voltages generated based on input image data in synchronization with a driving sequence of the first and second gate lines;

displaying an image based on the data voltages;

generating a first gamma reference voltage based on a first gamma curve;

generating a second gamma reference voltage based on a second gamma curve different from the first gamma curve;

outputting first data voltages generated based on the first gamma reference voltage during the first duration; and outputting second data voltages generated based on the second gamma reference voltage during the second duration, wherein the first gamma reference voltage and the second gamma reference voltage are generated by a gamma reference voltage generator connected to the data driver.

17. The method of claim 16, further comprising:
outputting a common voltage to a display panel, wherein when a first optimum common voltage to display the first color or a second optimum common voltage to display the second color is higher than the common voltage, the first gamma curve or the second gamma curve has lower voltages than a reference gamma curve has, and wherein when the first optimum common voltage or the second optimum common voltage is lower than the common voltage, the first gamma curve or the second gamma curve has higher voltages than the reference gamma curve has.

18. The method of claim 17, wherein
when the first optimum common voltage is higher than the second optimum common voltage, the first gamma curve has lower voltages than the second gamma curve has, and when the first optimum common voltage is lower than the second optimum common voltage, the first gamma curve has higher voltages than the second gamma curve has.

* * * * *